United States Patent
Fujita

(10) Patent No.: US 7,415,676 B2
(45) Date of Patent: Aug. 19, 2008

(54) VISUAL FIELD CHANGING METHOD

(75) Inventor: Takushi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 784 days.

(21) Appl. No.: 10/642,144

(22) Filed: Aug. 18, 2003

(65) Prior Publication Data

US 2004/0046796 A1    Mar. 11, 2004

(30) Foreign Application Priority Data

Aug. 20, 2002    (JP) ............................. 2002-239735

(51) Int. Cl.
*G06F 3/048* (2006.01)
(52) U.S. Cl. .................. 715/781; 715/784; 715/785; 715/788; 715/799; 715/817; 715/818; 715/851; 715/854
(58) Field of Classification Search ......... 715/817–818, 715/850–851, 784–785, 799, 854, 788
See application file for complete search history.

(56) References Cited

U.S. PATENT DOCUMENTS

| | | | |
|---|---|---|---|
| 5,874,956 A * | 2/1999 | LaHood ...................... 715/854 |
| 6,128,014 A | 10/2000 | Nakagawa et al. |
| 6,683,628 B1 | 1/2004 | Nakagawa et al. |
| 2002/0084991 A1* | 7/2002 | Harrison et al. ............. 345/173 |
| 2002/0112237 A1* | 8/2002 | Kelts .......................... 725/39 |
| 2003/0103064 A1* | 6/2003 | Knighton et al. ............ 345/660 |
| 2004/0095314 A1 | 5/2004 | Nakagawa et al. |
| 2004/0210386 A1* | 10/2004 | Wood et al. ................. 701/208 |
| 2006/0182055 A1* | 8/2006 | Coffee et al. ................ 370/328 |

FOREIGN PATENT DOCUMENTS

| | | |
|---|---|---|
| JP | 8-115197 | 5/1996 |
| JP | 9-009231 | 1/1997 |

(Continued)

OTHER PUBLICATIONS

Greg Bender, Michael Bohan, Alex Chaparro☐☐Mouse-Over vs. Point-and-Click: WHich is Better?☐☐Usability News Winter 1999☐☐Last Update Apr. 28, 2001.*

Beverly Harrison, Gordon Kurtenbach, Kim Vicente☐☐An experimental evaluation of transparent user interface tools and information content☐☐Nov. 14-17, 1995.*

(Continued)

*Primary Examiner*—Doug Hutton
*Assistant Examiner*—Andrea N Long
(74) *Attorney, Agent, or Firm*—Staas & Halsey LLP

(57) ABSTRACT

In an image display system for changing a display of image data based on a visual field changing instruction, one or a plurality of visual field changing start region associated with a visual field changing operation, which defines display update processing contents of the image data, is displayed in a display window. When a pointer enters the visual field changing start region, the visual field changing operation associated with the visual field changing start region is activated, and the display of the image data is updated in accordance with the display update processing contents defined by the activated visual field changing operation, based on a relative movement amount of the pointer based on the position of the pointer at a time when the visual field changing operation has been activated. In the case where the pointer is moved to outside of the visual field changing start region corresponding to the activated visual field changing operation and is placed in the display window, the visual field changing operation is deactivated.

10 Claims, 21 Drawing Sheets

FOREIGN PATENT DOCUMENTS

| | | |
|---|---|---|
| JP | 10-198517 | 7/1998 |
| JP | 10-200807 | 7/1998 |
| JP | 11-327433 | 11/1999 |
| JP | 2001-022496 | 1/2001 |
| JP | 2001-503896 | 3/2001 |
| WO | 98/21643 | 5/1998 |

OTHER PUBLICATIONS

Wendy Schafer☐☐Using interactive maps for navigation and collaboration☐☐CHI Mar. 31-Apr. 5, 2001.*

The Flash 4 Bible (IDG Books) The Flash Event Handlers internet archive wayback machine cited Aug. 15, 2000.*

Japanese Patent Office Action, mailed Aug. 21, 2007 and issued in corresponding Japanese Patent Application No. 2002-239735.

* cited by examiner

VISUAL FIELD CHANGING METHOD

BACKGROUND OF THE INVENTION

1. Field of the Invention

The present invention relates to a visual field changing method capable of easily changing and displaying a visual field to be displayed on a display screen by using an operation input part such as a mouse, a stylus pen, a touch panel or the like in a system for displaying image data, such as two-dimensional document and image, a three-dimensional virtual space, and a video of a real world captured by a camera in a predetermined display apparatus.

2. Description of the Related Art

Along with the rapid advancement of computer technology, a display object to be displayed on a screen of a display apparatus such as a display is being varied. Some display objects cannot be displayed completely within a screen of a display apparatus. In this case, a user displays a desired display content on a screen by changing a visual field.

As a visual field changing method, for example, a method used in most application software operated on a window system, such as Windows (Microsoft Corp.) and MacOS (Apple Computer, Inc.) or X-Window run on UNIX, is well-known.

According to the above-mentioned method, a scroll bar for moving a visual field upward/downward or rightward/leftward is provided at an end portion of a window screen having a rectangular region displayed on a display, and by pressing a mouse button on a slider in a scroll bar region and dragging the slider, the visual field is moved upward/downward or rightward/leftward in proportion to a drag amount, whereby a display content is updated. It is also appreciated that a zoom bar for moving a visual field forward/backward or for zooming is similarly provided.

Furthermore, when a scroll button at both ends of the scroll bar or an area between the slider and the scroll button on the scroll bar is clicked, a visual field is moved upward/downward or rightward/leftward by a predetermined amount. This also applies to the operation of a zoom bar in a similar manner. When a slider on the zoom bar is dragged or a zoom button or another area is clicked, a visual field is zoomed.

As another example, JP 2001-503896 A discloses a method for providing a plurality of visual field changing icons for changing a visual field in a three-dimensional space, which is also used often. According to this method, the respective icons provided on a screen are assigned functions, such as parallel movement of a visual field in upward/downward and rightward/leftward directions, movement in a forward/backward direction, rotation around a rotation axis in a visual field direction, rotation of a camera based on a displayed object, rotation of a camera based on a camera position, and the like. When a mouse cursor is moved to these buttons, a mouse button is pressed, and the mouse cursor is moved in any direction while the mouse button is being pressed, visual field changing determined on the button basis is performed in accordance with the movement direction and the movement amount. Regarding the movement amount, the visual field changing amount may be set proportional to the movement amount of a mouse cursor on a screen from a position where the button has been pressed, or the visual field changing speed may be set proportional to the movement amount of the mouse cursor.

Furthermore, JP 10(1998)-200807 A and JP 9(1997)-9231 A disclose a method for partitioning a window for displaying a display object into 5 (or 4) regions and assigning visual field changing processing on the partitioned region basis, instead of displaying a scroll bar, a zoom bar, an icon, and the like.

More specifically, the partitioned regions are respectively assigned upward/downward and rightward/leftward movement or zooming. When a mouse cursor is moved to the regions assigned upward, downward, leftward, and rightward movement and a mouse button is pressed, a visual field is moved at a constant speed in the assigned direction while the mouse button is being pressed. Furthermore, when a mouse cursor is moved to the region assigned zooming, and a mouse right button is pressed, a visual field is zoomed in. When a mouse cursor is moved to the region assigned zooming, and a mouse left button is pressed, a visual field is zoomed out. Partitioned lines of these regions are not necessarily displayed on a screen explicitly.

Furthermore, as represented by Adobe Acrobat Reader produced by Adobe Systems, Inc. the following method is also used often: a mouse cursor is placed at an arbitrary position in a window, and a mouse button is pressed, followed by dragging in a desired movement direction of a visual field, whereby a visual field or a display object is moved in parallel in the dragged direction. According to this method, the visual field changing amount may be set proportional to the movement amount of a mouse cursor on a screen from a position where the mouse button has been pressed, or the visual field changing amount may be set proportional to the visual field changing speed. Furthermore, another mouse button may be assigned zooming. Alternatively, by selecting an icon or a menu, the effect of mouse dragging may be switched to upward, downward, leftward and rightward movement of a visual field, zooming, tilt and pan of a camera, rotation of a camera based on an object, and the like.

However, according to the method for providing a scroll bar and a zoom bar, the display width of the scroll bar and the zoom bar is generally very small, so that a minute operation of a mouse cursor and the like are required for moving a mouse cursor on a button of the scroll bar or the zoom bar, on a handle, or on an area between the button and the handle so as to change a visual field. Therefore, such an operation is difficult for a beginner, and is not necessarily effective for an expert.

Similarly, according to the method for providing a plurality of visual field changing icons on a screen, a minute operation of moving a mouse cursor on a small icon is required. Therefore, such an operation is difficult for a beginner, and is not necessarily effective for an expert.

On the other hand, according to the method for partitioning a window for displaying a display object into a plurality of regions, and assigning visual field changing processing on the partitioned regions basis, it is required to continue to press a mouse button while the visual field is being moved upward, downward, rightward and leftward, and release the mouse button immediately when the visual field is moved to a desired position. The visual field is changed at a constant speed while the mouse button is being pressed. Therefore, in the case where it is desired to move the visual field largely, considerable amount of time is taken. Furthermore, when a visual field changing speed is set to be large so as to shorten movement time, an operation of releasing a mouse button at correct timing so as to stop changing a visual field becomes very minute, which may make it difficult to perform actual operation.

Furthermore, according to the method for using dragging, there is no particular problem in the case of changing a visual field upward, downward, rightward and leftward. However, when complicated visual field changing such as zooming and rotation of a camera is attempted, it is required to adopt another technique or switch a mode by selecting an icon or a menu. In the former case, the same problem as described above occurs. In the latter case, the procedure of changing a visual field becomes complicated, which may impair the easiness of an operation.

On the other hand, in the case of performing an operation input using a tool having no buttons such as a mouse (e.g., a touch panel, a stylus pen, etc.) as an operation input part, it becomes difficult to discriminate pointer movement from dragging. More specifically, in a touch panel, a stylus pen, and the like, it is required to move a finger or a stylus pen while keeping it in contact with an operation panel so as to move a pointer. In most systems, pressing of a mouse button is considered as the same state as that in the case where a finger and a stylus pen is brought into contact with an operation panel. More specifically, pointer movement and dragging are not discriminated from each other. Thus, in order to change a visual field using a touch panel, a stylus pen, or the like, it is required to adopt an operational method in which it is not necessary to discriminate pointer movement from dragging.

SUMMARY OF THE INVENTION

Therefore, with the foregoing in mind, it is an object of the present invention to provide a visual field changing method capable of changing a visual field only by moving a pointer without any operational constraint depending upon the type of an operation input apparatus.

In order to achieve the above-mentioned object, a visual field changing method of the present invention includes, in an image display system having functions of displaying image data in a display window, determining a position of a pointer in the display window by using an operation input part, and receiving a visual field changing instruction from a user and changing a display of the image data based on the visual field changing instruction: displaying one or a plurality of visual field changing start region associated with a visual field changing operation, which defines display update processing contents of the image data, in the display window; determining whether or not the pointer is in the visual field changing start region; activating the visual field changing operation associated with the visual field changing start region when the pointer enters the visual field changing start region; while the visual field changing operation is being activated, detecting a relative movement amount of the pointer based on the position of the pointer at a time when the visual field changing operation is activated, and updating the display of the image data in accordance with the display update processing contents defined by the activated visual field changing operation, based on the detected relative movement amount of the pointer; determining whether or not a predetermined condition for deactivating the visual field changing operation is satisfied; and in a case where the predetermined condition for deactivating the visual field changing operation is satisfied, deactivating the visual field changing operation.

According to the above-mentioned configuration, a visual field changing operation can be started and easily performed only by moving a pointer by the operation input part, and a display of a screen can be changed without performing a complicated operation.

Furthermore, it is preferable that the visual field changing method of the present invention includes: determining whether or not the pointer is in the display window; and in determining whether or not the predetermined condition for deactivating the visual field changing operation is satisfied, determining that the predetermined condition for deactivating the visual field changing operation is satisfied in a case where the pointer is moved to an outside of the visual field changing start region associated with the activated visual field changing operation and is placed in the display window. According to this configuration, a visual field changing operation can be easily performed only by moving a pointer by the operation input part, and a display of a screen can be changed without performing a complicated operation.

Furthermore, it is preferable that the visual field changing method of the present invention includes: detecting pressing or releasing of a button of the operation input part or an operation equivalent thereto; and in determining whether or not the predetermined condition for deactivating the visual field changing operation is satisfied, determining that the predetermined condition for deactivating the visual field changing operation is satisfied in a case where the pressing or releasing of the button or the operation equivalent thereto is detected. According to this configuration, a visual field changing operation can be completed at an arbitrary time, independently from the operation of moving a pointer.

Furthermore, in the visual field changing method of the present invention, it is preferable that the display update processing contents of the image data defined by the visual field changing operation include calculating a visual field changing amount only with respect to either one component among the detected relative movement amount components in an upward/downward direction and a rightward/leftward direction of the pointer with respect to the display window. According to this configuration, for example, in the visual field changing processing of moving a visual field in an upward/downward direction, after a pointer is moved to activate a visual field changing operation, a visual field can be moved in an upward/downward direction in proportion to only a movement amount of an upward/downward direction of the pointer, irrespective of how the pointer is moved.

Furthermore, in the visual field changing method of the present invention, it is preferable that the visual field changing start region is displayed in a semi-transparent state on a front side of a display object to be displayed in the display window so that the display object is seen through. According to this configuration, a display object placed in a visual field changing start region can also be seen, so that a range where a display object is seen is enlarged, and a visual field can be moved while confirming a display object.

Furthermore, in the visual field changing method of the present invention, it is preferable that the visual field changing start region is displayed so as to be placed in contact with a border between an inside of the display window and an outside of the display window. According to this configuration, even in the case where a pointer is moved to pass through a visual field changing start region to an outside of the display window, a visual field can be changed continuously while the pointer is placed outside of the display window, which makes it unnecessary to perform a minute operation such as movement of a pointer in a narrow visual field changing start region.

Furthermore, in the visual field changing method of the present invention, it is preferable that, while the visual field changing operation is being activated, the visual field changing start region corresponding to the activated visual field changing operation is displayed in a different manner from that in a case where the visual field changing operation is deactivated. According to this configuration, it is easily known which visual field changing operation is activated.

Furthermore, it is preferable that the visual field changing method of the present invention includes detecting a selecting operation in the operation input part, and in a case where the pointer is in the display window and the selecting operation is detected, the display of the image data is updated so that a display object displayed at a position of the pointer is moved to a center of the display window. According to this configuration, a display content in a window can be easily scrolled by a click of a mouse button, tapping of a touch panel, or the like.

Furthermore, the visual field changing method of the present invention includes, in detecting the selecting operation: obtaining a movement distance of the pointer from a point where pressing of the button or an operation equivalent thereto has been performed; and in a case where the movement distance of the pointer from the point where the pressing of the button or the operation equivalent thereto has been performed is equal to or less than a predetermined threshold value, when releasing of the button or an operation equivalent thereto is performed, determining that the selecting operation has been performed. According to this configuration, even in the case of using an operation input part such as a touch panel, in which it is difficult to perform an operation equivalent to pressing or releasing of a mouse button while holding a pointer, by taking a large threshold value, it can be determined that a selecting operation has been performed even if the pointer is moved to some degree, and hence, the same operation as the visual field changing by a click of a mouse button or the like can be performed.

In order to achieve the above-mentioned object, a visual field changing method of the present invention includes, in an image display system having functions of displaying image data in a display window, determining a position of a pointer in the display window by using an operation input part, and receiving a visual field changing instruction from a user and changing a display of the image data based on the visual field changing instruction: detecting a selecting operation in the operation input part; in a case where the pointer is in the display window, dividing the display window into two regions of a central region of the display window and a region outside of the central region of the display window, and determining in which region the pointer is placed; in a case where it is determined that the pointer is placed in the region outside of the central region of the display window when the selecting operation is detected, updating the display of the image data so that a display object displayed at a position of the pointer is moved to a center of the display window; and in a case where it is determined that the pointer is placed in the central region of the display window when the selecting operation is detected, updating the display of the image data so that the display object displayed at the position of the pointer is moved to the center of the display window and displayed in an enlarged state at a predetermined factor.

According to the above-mentioned configuration, even in a click of the same mouse button or an operation equivalent thereto, visual field changing can be varied depending upon the operation position, which makes it unnecessary to switch a visual field changing mode and enables a visual field to be changed rapidly.

Furthermore, it is preferable that the visual field changing method of the present invention includes: determining whether or not a distance, by which the pointer has been moved from a point where pressing of a button or an operation equivalent thereto has been performed to a point where releasing of the button or an operation equivalent thereto has been performed, exceeds a predetermined threshold value; in a case where it is determined that the distance does not exceed the predetermined threshold value, determining that the selecting operation has been performed; in a case where it is determined that the distance exceeds the predetermined threshold value, determining that dragging has been performed instead of the selecting operation; and in a case where the pointer is placed in the central region of the display window, and the pressing of the button or the operation equivalent thereto is performed, followed by the dragging, during a period of time before the releasing of the button or the operation equivalent thereto is performed, updating the display of the image data continuously so that the display object, which is displayed at the position of the pointer when the pressing of the button or the operation equivalent thereto has been performed, is displayed so as to move in the display window, following the movement of the pointer. According to this configuration, even in the case of using an operation input part such as a touch panel, in which it is difficult to discriminate pointer movement from dragging, pointer movement can be discriminated from dragging and the selecting operation without switching a mode or the like, and a visual field can be changed rapidly.

Furthermore, it is preferable that the visual field changing method of the present invention includes: detecting a selecting operation in the operation input part; in a case where the pointer is in the display window, dividing the display window into two regions of a central region of the display window and a region outside of the central region of the display window, and determining in which region the pointer is placed; in a case where it is determined that the pointer is placed in the region outside of the central region of the display window when the selecting operation is detected, updating the display of the image data so that a display object displayed at a position of the pointer is moved to a center of the display window; and in a case where it is determined that the pointer is placed in the central region of the display window when the selecting operation is detected, updating the display of the image data so that the display object displayed at the position of the pointer is moved to the center of the display window and displayed in an enlarged state at a predetermined factor. According to this configuration, by combining the above-mentioned visual field changing methods, various visual field changing operations can be easily performed without being influenced by an operation input part.

It is preferable that the visual field changing method of the present invention includes: determining whether or not a distance, by which the pointer has been moved from a point where pressing of a button or an operation equivalent thereto has been performed to a point where releasing of the button or an operation equivalent thereto has been performed, exceeds a predetermined threshold value; in a case where it is determined that the distance does not exceed the predetermined threshold value, determining that the selecting operation has been performed; in a case where it is determined that the distance exceeds the predetermined threshold value, determining that dragging has been performed instead of the selecting operation; and in a case where the pointer is placed in the central region of the display window, and the pressing of the button or the operation equivalent thereto is performed, followed by the dragging, during a period of time before the releasing of the button or the operation equivalent thereto is performed, updating the display of the image data continuously so that the display object, which is displayed at the position of the pointer when the pressing of the button or the operation equivalent thereto has been performed, is displayed so as to move in the display window, following the movement of the pointer. According to this configuration, even in the case of using an operation input part such as a touch panel, in which it is difficult to discriminate pointer movement from dragging, pointer movement can be discriminated from dragging and the selecting operation without switching a mode or the like, and a rapid visual field changing operation can be performed.

Next, in order to achieve the above-mentioned object, a visual field changing method of the present invention includes, in an image display system having functions of displaying image data in a display window, determining a position of a pointer in the display window by using an operation input part, and receiving a visual field changing instruction from a user and changing a display of the image data based on the visual field changing instruction: selecting one of display objects as a representative object; detecting a selecting operation in the operation input part; determining which display object the pointer points in the display window when the selecting operation is detected; in a case where the display object determined to be pointed by the pointer is a representative object, updating a display of the image data so that a point pointed on the display object is displayed at a center of the display window; and in a case where the display object determined to be pointed by the pointer is not a representative object, updating a display of the image data so that the entire display object is displayed with a predetermined size in the display window.

According to the above-mentioned configuration, in the case where a point on a representative object is pointed by a pointer when a click of a mouse button or an operation equivalent thereto is detected, a visual field is moved so that the pointed point is displayed at the center of the window and the display is updated. On the other hand, in the case where a display object other than the representative object is pointed by the pointer, a visual field is moved so that the entire display object is displayed with a predetermined size in the window, whereby the display is updated.

These and other advantages of the present invention will become apparent to those skilled in the art upon reading and understanding the following detailed description with reference to the accompanying figures.

DESCRIPTION OF THE PREFERRED EMBODIMENTS

A typical example of the present invention is realized by using a computer system composed of an operation input part such as a mouse and a keyboard, a display part such as a CRT and an LCD, a CPU, a memory, a hard disk drive, a network connecting part, a graphic circuit, and the like. As the operation input part, a trackball, a touch panel, a stylus pen, a remote controller, or the like may be used instead of a mouse. The computer system is not particularly limited, and may be of a desktop type, a notebook type, a portable type, a pen operation type, or the like.

Embodiment 1

Figure 1:
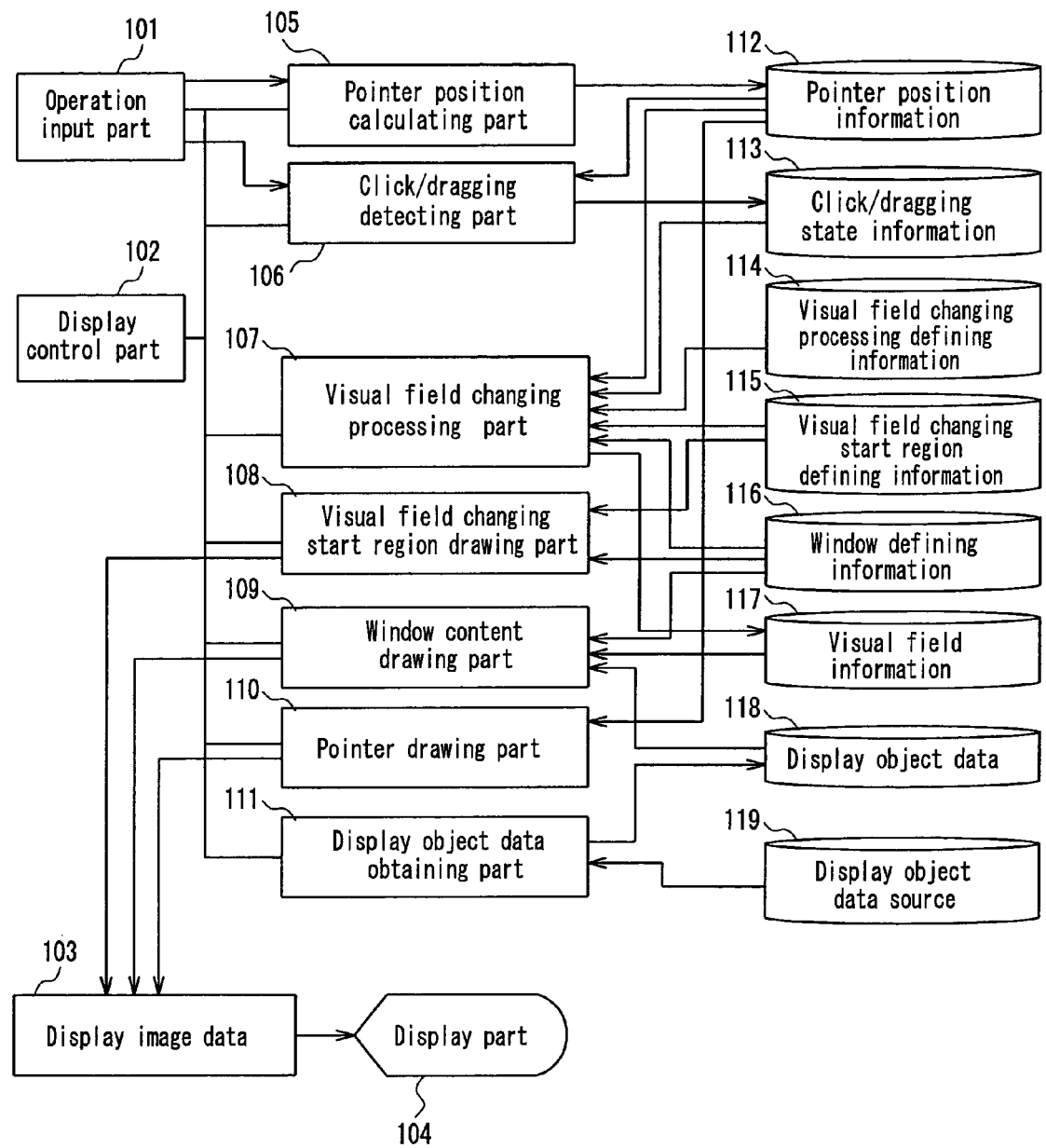
FIG. 1 is a modular configuration diagram for implementing a visual field changing method of Embodiment 1 according to the present invention.

Hereinafter, a visual field changing method of Embodiment 1 according to the present invention will be described with reference to the drawings. FIG. 1 is a modular configuration diagram for implementing the visual field changing method of Embodiment 1 according to the present invention.

In FIG. 1, reference numeral 101 denotes an operation input part such as a mouse, and 102 denotes a display control program for generating display image data 103 and displaying it on a display part 104. Reference numeral 105 denotes a pointer position calculating part for calculating a pointer coordinate on a display screen in the display part 104, and 106 denotes a click/dragging detecting part for detecting a click or dragging in the operation input part 101.

Furthermore, reference numeral 109 denotes a window content drawing part for drawing a content to be displayed in a display window, 110 denotes a pointer drawing part for drawing a pointer on a display screen, and 111 denotes a display object data obtaining part for obtaining display image data to be displayed. Reference numeral 107 denotes a visual field changing processing part for updating display image data in accordance with visual field information, and 108 denotes a visual field changing start region drawing part for drawing a visual field changing start region for obtaining visual field information as a visual field changing instruction.

In FIG. 1, the operation input part 101 may be any of a mouse, a touch panel, a tablet, a stylus pen, a remote controller, a touch pad, and the like. The operation input part 101 is used for inputting a pointer operation, a click (selecting) operation, dragging, and the like.

Furthermore, the display control program 102 controls display processing in a display window. The display control program 102 is stored in a memory or the like, and executed by a CPU or the like.

Next, the display image data 103 is bitmap data of a display image to be displayed on the display part 104, stored in a frame memory or the like. The display part 104 displays an image defined by the display image data 103 on a screen, and is composed of a graphic output circuit or a display apparatus such as a CRT and an LCD.

The pointer position calculating part 105 analyzes an input from the operation input part 101 at all times, and calculates the position of a pointer on a screen. The calculation result is stored in a memory or the like as the pointer position information 112. When the pointer position information 112 is changed, the display control program 102 is notified of the change as an event.

Furthermore, the click/dragging detecting part 106 analyzes an input from the operation input part 101 at all times, and detects that a click or dragging has been performed. The detection result is stored in a memory or the like as click/dragging state information 113. When the click/dragging state information 113 is changed, the display control program 102 is notified of the change as an event.

Next, the visual field changing processing part 107 executes the visual field changing processing based on the pointer position information 112, the click/dragging state information 113, visual field changing processing defining information 114, visual field changing start region defining information 115 and window defining information 116 stored in a memory or the like, calculates a change in visual field information 117 by changing a visual field, and updates the visual field information 117.

Herein, the visual field changing processing defining information 114 defines a method for calculating a change in the visual field information 117 based on a positional relationship between the visual field changing start region and the pointer displayed on the screen. Furthermore, the visual field changing start region defining information 115 defines a position in a display window where the visual field changing start region is to be displayed, a display form, a range for determining a visual field changing start region, and the like.

Figure 4:
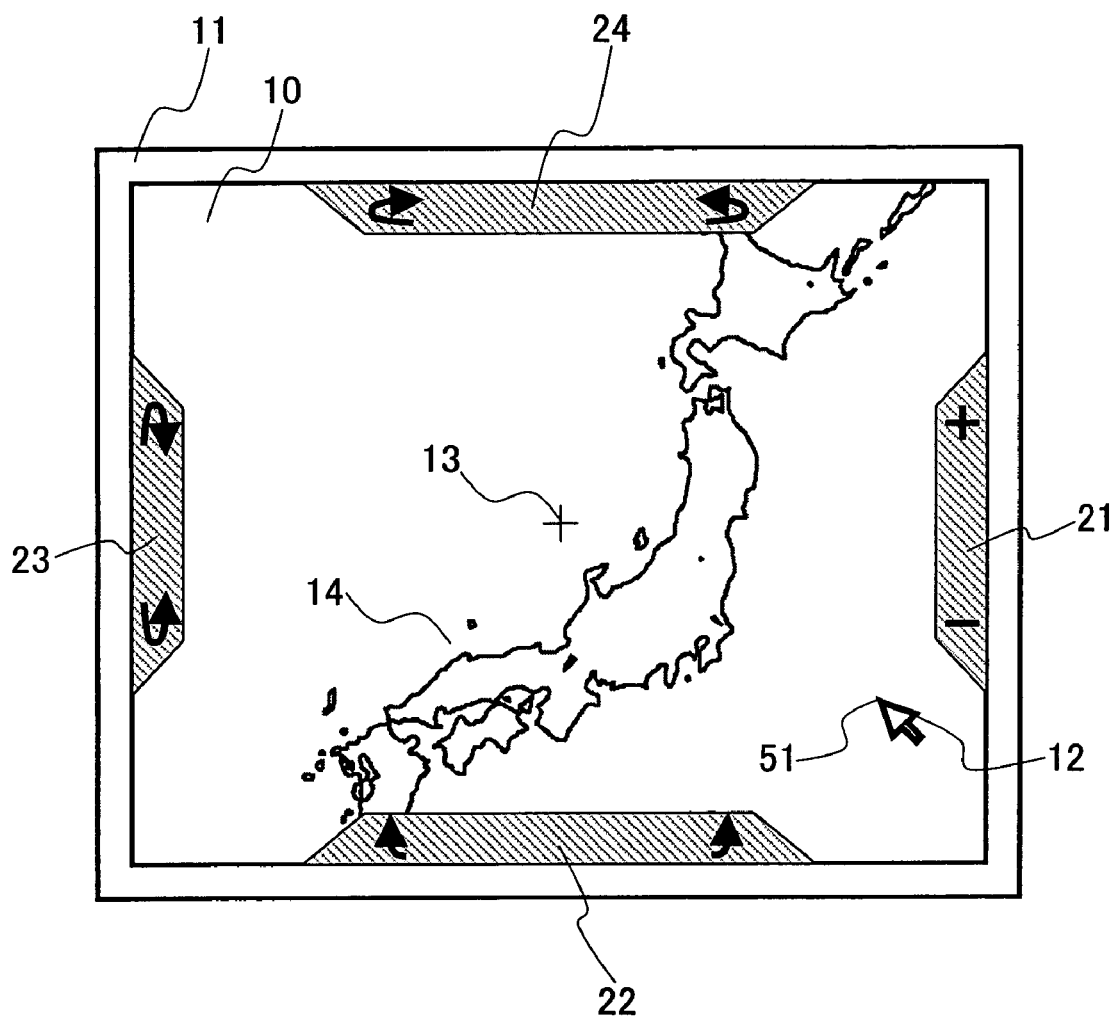
FIG. 4 shows an exemplary screen display in the visual field changing method of Embodiment 1 according to the present invention.

For example, as shown in FIG. 4, in the case where a plurality of visual field changing start regions 21 to 24 are displayed on a screen, the visual field changing processing defining information 114 and the visual field changing start region defining information 115 are separately prepared with respect to the respective visual field changing start regions 21 to 24.

Furthermore, the window defining information 116 defines a display position and a display size of a display window on a screen. The visual field information 117 defines a visual field for displaying a display object in a display window, i.e., defines which range of a display object should be displayed in which observation state.

Next, the visual field changing start region drawing part 108 displays a visual field changing start region to be a reference for changing a visual field by moving a pointer on a screen, in a display window, based on the visual field changing start region defining information 115 and the window defining information 116. In Embodiment 1, as shown in FIG. 4, it is assumed that the visual field changing start region drawing part 108 displays the visual field changing start regions 21 to 24 in a semi-transparent state on a front side of the display object 14.

Furthermore, the window content drawing part 109 generates, as the display image data 103, an image of a display object to be displayed in a display window, based on the window defining information 116, the visual field information 117 and the display object data 118.

Herein, the display object data 118 is required for displaying a display object. The display object data 118 is obtained from a display object data source 119 by the display object data obtaining part 111. The display object data source 119 refers to a place where the display object data 118 is stored, such as an external storage apparatus, a network, or the like.

Furthermore, the pointer drawing part 110 draws the pointer 12 under the condition that the pointer 12 is merged with the generated display image data 103, based on the pointer position information 112.

FIG. 4 shows a display example in a display window in Embodiment 1 according to the present invention. In FIG. 4, a display window 10 and a window frame 11 are displayed. In the display window 10, a pointer 12, a window center coordinate 13, a display object 14, and visual field changing start regions 21 to 24 are displayed. In Embodiment 1, a map is displayed as the display object 14 in the display window 10. At the center of the display window 10, the window center coordinate 13 indicating the center of the display window is displayed. Furthermore, the window frame 11 is displayed so as to circumscribe the display window 10. The window frame 11 and the window center coordinate 13 may not be displayed, if necessary.

The visual field changing start regions 21 to 24 displayed in the display window 10 are used for changing a visual field by moving the pointer 12 so as to allow the pointer 12 to pass through the visual field changing start regions 21 to 24. The respective visual field changing start regions 21 to 24 are previously associated with different visual field changing operations.

The visual field changing start regions 21 to 24 are displayed in an arbitrary form. In Embodiment 1, in order to facilitate the movement of the pointer 12 for changing a visual field and easily visualize the display object 14 to be displayed in the display window 10, the visual field changing start regions 21 to 24 are displayed in a semi-transparent state on a front side of the display object 14 in the vicinity of ends of the display window 10 in contact with the window frame 11 so that the regions extend longer in the directions along the window frame 11.

In FIG. 4, the visual field changing start region 21 for zooming and the visual field changing start region 23 for up-and-down rotation are disposed in a vertically oriented form along borders at the right and left ends of the display window 10. The visual field changing start region 22 for azimuth rotation and the visual field changing start region 24 for right-and-left rotation are disposed in a horizontally oriented form along borders at the lower and upper ends of the display window 10. It is preferable that pictorial symbols or the like are drawn in the respective visual field changing start regions 21 to 24 so as to recognize the types of the associated visual field changing operations.

Figure 2:
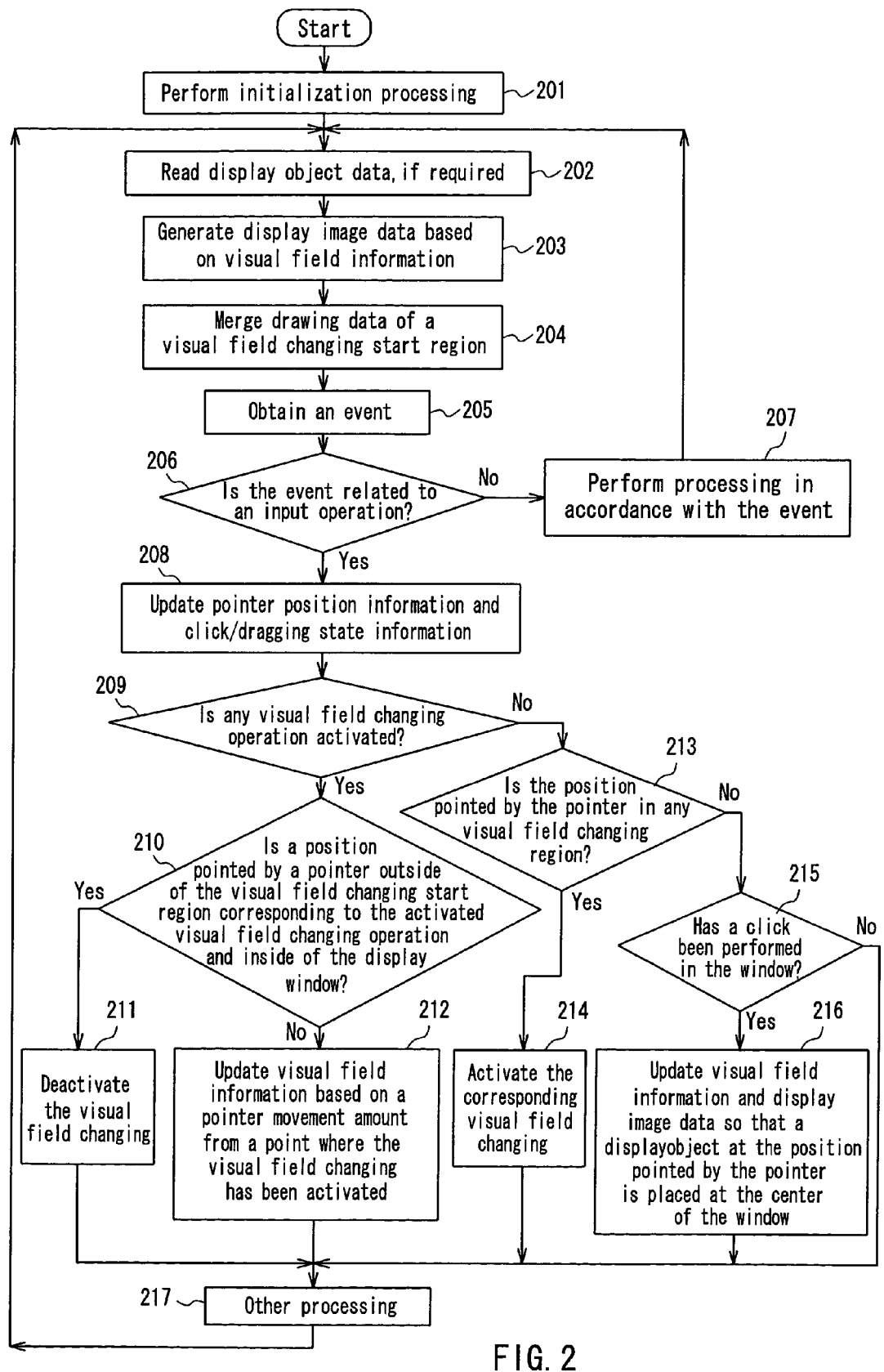
FIG. 2 is a flow chart illustrating processing in the visual field changing method of Embodiment 1 according to the present invention.

FIG. 2 is a flow chart illustrating processing in the visual field changing method of Embodiment 1 according to the present invention. The flow chart of processing in FIG. 2 is implemented by executing the display control program 102 with a CPU and a memory. At this time, each of the operation input part 101, and the pointer position calculating part to the display object data obtaining part 111 is invoked by the instruction from the display control program 102, whereby the processing is executed.

First, initialization processing is performed (Operation 201). In the initialization processing, initial values of the pointer position information 112, the click/dragging state information 113, the visual field changing processing defining information 114, the visual field changing start region defining information 115, and the window defining information 116 are set.

Next, the display object data 118 is read, if required (Operation 202). The display image data 103 on the display object 14 to be displayed in the display window 10 is generated by the window content drawing part 109, based on the window defining information 116, the visual field information 117, and the display object data 118 (Operation 203). Furthermore, the drawing data of the visual field changing start regions 21 to 24 is merged with the generated display image data 103 by the visual field changing start region drawing part 108, based on the visual field changing region defining information 115 and the window defining information 116 (Operation 204).

An event is obtained (Operation 205). Herein, the event refers to information given to the display control program 102 from a generation origin of a cause, in the case where the position of the pointer 12 is changed, and the states of a click, dragging, and the like are changed.

Next, it is determined whether or not the obtained event is related to an input operation (Operation 206). In the case where it is determined that the obtained event is not related to an input operation (Operation 206: NO), after processing is performed in accordance with the event, processing from is continued from Operation 202 (Operation 207).

In the case where it is determined that the obtained event is related to an input operation (Operation 206: YES), the pointer position is calculated by the pointer position calculating part 105, and the pointer position information 112 is updated. Furthermore, a click or dragging is detected by the click/dragging detecting part 106, and the click/dragging state information 113 is updated (Operation 208).

Next, it is determined whether or not any of the visual field changing operations defined by the visual field changing processing defining information 114 and the visual field changing start region defining information 115 has been activated (Operation 209). In the case where it is determined that any of the visual field changing operations has been activated (Operation 209: YES), it is determined whether or not the position pointed by the pointer 12 is outside the visual field changing start region associated with the currently activated visual field changing, and is inside the display window 10 (Operation 210).

In the case where it is determined that the position pointed by the pointer 12 is outside the visual field changing start region associated with the currently activated visual field changing, and is inside the display window 10 (Operation 210: YES), the activated visual field changing is deactivated (Operation 211).

In the case where it is determined that the position pointed by the pointer 12 is inside the visual field changing start region associated with the currently activated visual field changing, or is outside the display window 10 (Operation 210: NO), the activated state of the visual field changing is maintained, the change amount of a visual field is calculated based on the pointer movement amount from the point where the visual field changing is activated, in accordance with the processing content regarding the currently activated visual field changing defined by the visual field changing processing defining information 114, and the visual field information 117 is updated (Operation 212).

A specific calculation example of the change amount of a visual field is as follows: regarding the visual field changing start region 21 related to zooming displayed in a vertically oriented form at the right end of the display window 10 in FIG. 4, visual field changing in a forward/backward direction or zooming is performed by the amount proportional to the vertical component on the screen among the pointer movement amounts from the point where the visual field changing is activated. Similarly, regarding the visual field changing start region 23 related to up-and-down rotation displayed in a vertically oriented form at the left end of the display window 10, the direction of a visual field is rotated in an up-and-down direction by the amount proportional to the vertical component on the screen among the pointer movement amounts from the point where the visual field changing is activated.

On the other hand, regarding the visual field changing start region 22 related to azimuth rotation displayed in a horizontally oriented form at the lower end of the display window 10, the azimuth direction of a visual field is changed by the amount proportional to the horizontal component on the screen among the pointer movement amounts from the point where the visual field changing is activated. Similarly, regarding the visual field changing start region 24 related to right-and-left rotation displayed in a horizontally oriented form at the upper end of the display window 10, the direction of a visual field is changed in a right-and-left direction by the amount proportional to the horizontal component on the screen among the pointer movement amounts from the point where the visual field changing is activated.

Next, in the case where it is determined that any of the visual field changing operations has not been activated (Operation 209: NO), it is determined whether or not the position pointed by the pointer 12 is in any of the visual field changing start regions 21 to 24 (Operation 213).

In the case where the position pointed by the pointer 12 is in any of the visual field changing start regions 21 to 24 (Operation 213: YES), visual field changing corresponding to the visual field changing start region pointed by the pointer 12 is activated (Operation 214).

In the case where the position pointed by the pointer 12 is not in the visual field changing start regions 21 to 24 (Operation 213: NO), it is determined whether or not a click (selecting) operation or an operation equivalent thereto is performed under the condition that the position pointed by the pointer 12 is in the display window 10 (Operation 215).

In the case where it is determined that a click (selecting) operation or the like has been performed (Operation 215: YES), the visual field information 117 is updated so that a portion of the display object 14 displayed at the position pointed by the pointer 12 when the click (selecting) operation is performed is displayed in a central portion of the display window 10, and the display image data 103 on the display object 14 to be displayed in the display window 10 is updated by the window content drawing part 109, whereby a display is updated (Operation 216).

The following is preferable: the processing of gradually changing the visual field information 117 and updating the display image data 103 by the window content drawing part 109 is repeated until the visual field reaches an intended position, whereby a display of the display window 10 is changed smoothly from the state before visual field changing to the state after visual field changing.

In the case where it is determined that a click (selecting) operation or the like has not been performed (Operation 215: NO), and after Operations 211, 212, 214, and 216 are completed, the process returns to Operation 202 after the other processing is performed (Operation 217), and the above-mentioned processing is repeated.

The flow of the above-mentioned processing will be described based on a screen display. FIGS. 4 to 9 are exemplary display screens in the case of using the visual field changing method of Embodiment 1 according to the present invention.

In FIG. 4, as described above, a position 51 in the vicinity of the lower right region of the display window 10 is pointed by the pointer 12. In this state, it is assumed that any visual field changing operations are not activated, and a mouse button is not pressed. In the case where a touch panel is used as the operation input part 101, a mouse button is considered to be pressed when a finger or a stylus pen is brought into contact with the panel so as to move the pointer 12. Therefore, when the touch panel is used, it is assumed that the mouth button is being pressed.

Figure 5:
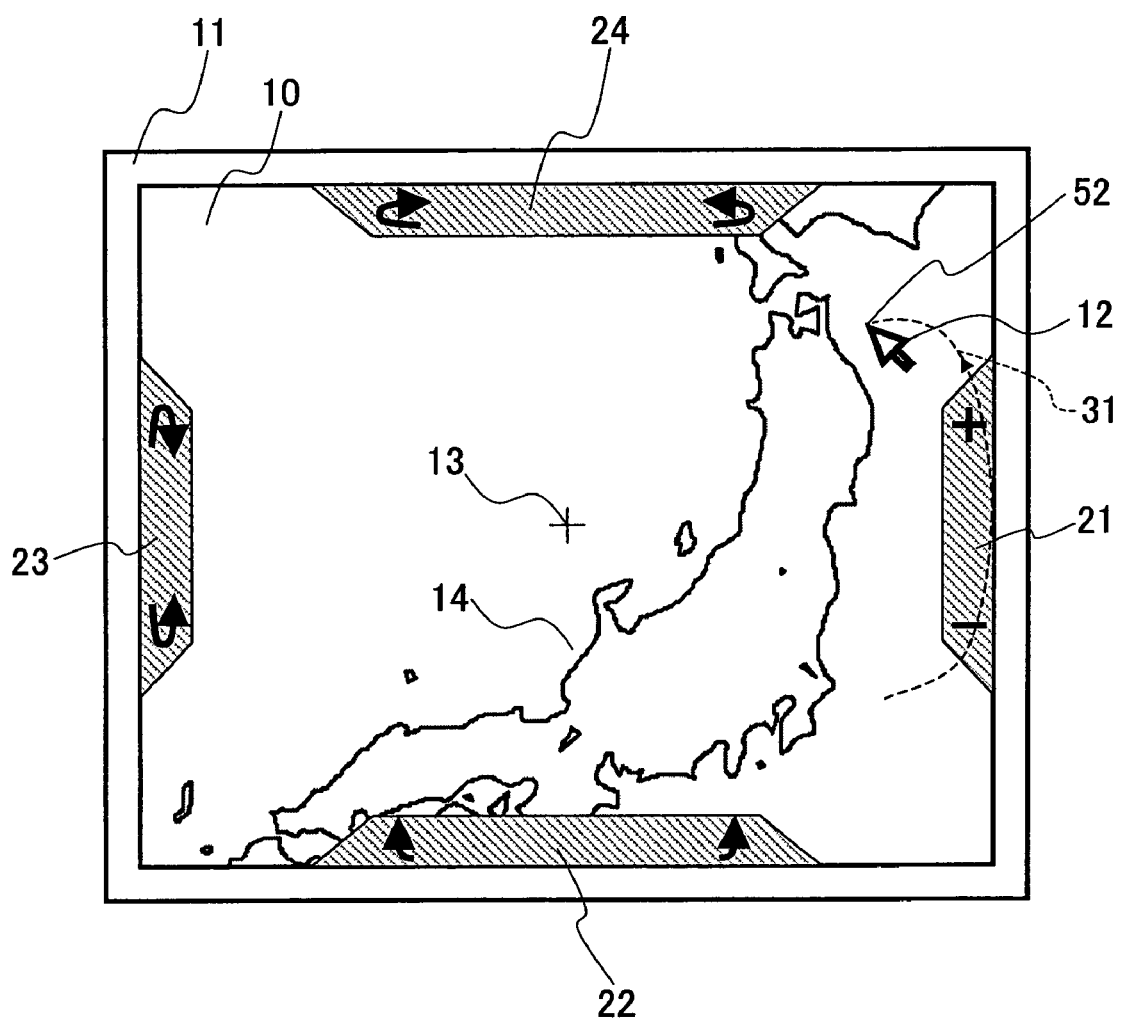
FIG. 5 shows an exemplary screen display of zooming in the visual field changing method of Embodiment 1 according to the present invention.

FIG. 5 shows an exemplary display screen in the case where the pointer 12 is moved along a pointer movement path 31 from the state of FIG. 4. As shown in FIG. 5, the pointer 12 enters the visual field changing start region 21 related to zooming, and thereafter, is moved to a position outside the visual field changing start region 21 and inside the display window 10.

When the pointer 12 is moved along the pointer movement path 31, a visual field is not changed until the pointer 12 enters the visual field changing start region 21, so that the display image data 103 is not updated.

Next, in the case where the pointer 12 traverses the border of the visual field changing start region 21 to enter the visual field changing start region 21, visual field changing related to zooming is activated. While the pointer 12 is moving in the visual field changing start region 21, the visual field advances in proportion to the movement amount in the vertical direction on the screen, and the display image data 103 is updated, whereby the display object 14 is gradually enlarged with respect to the position of the window center coordinate.

Furthermore, when the pointer 12 is moved to a position that is outside the visual field changing start region 21 and inside the display window 10, the activated visual field changing is deactivated and stopped.

As described above, according to the present invention, visual field changing can be performed only by moving a pointer without involving pressing or releasing of a mouse button.

Figure 6:
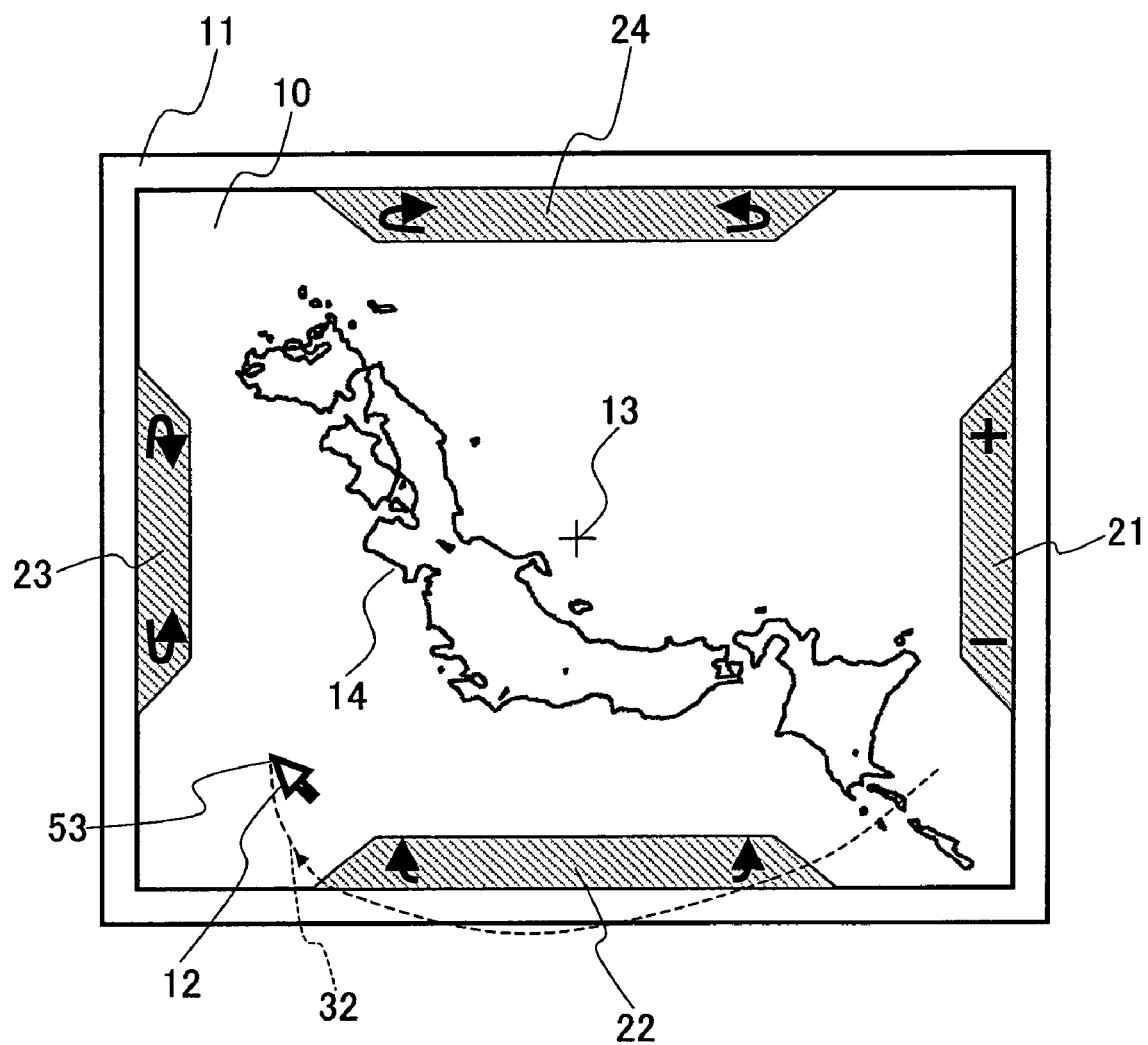
FIG. 6 shows an exemplary screen display of azimuth rotation in the visual field changing method of Embodiment 1 according to the present invention.

FIG. 6 shows an exemplary display screen in the case of moving the pointer 12 along a pointer movement path 32 from the state in FIG. 4. By moving the pointer 12 across the visual field changing start region 22 related to azimuth rotation, azimuth rotation, i.e., rotation around a normal line of the display object 14 in the vicinity of the window center coordinate 13 is performed.

The processing flow in this case is almost equal to that described with reference to FIG. 5. The pointer movement path 32 in FIG. 6 first enters the visual field changing start region 22, moves to a position that is outside the visual field changing start region 22 and outside the display window 10, enters the visual field changing start region 22 again, and moves to a position that is outside the visual field changing start region 22 and inside the display window 10. In this case, during a period after the pointer 12 enters the visual field changing start region 22 and before the pointer is moved to a position that is outside the visual field changing start region 22 and inside the display window 10, visual field changing can be continued even if the pointer 12 is positioned outside the display window 10.

Figure 7:
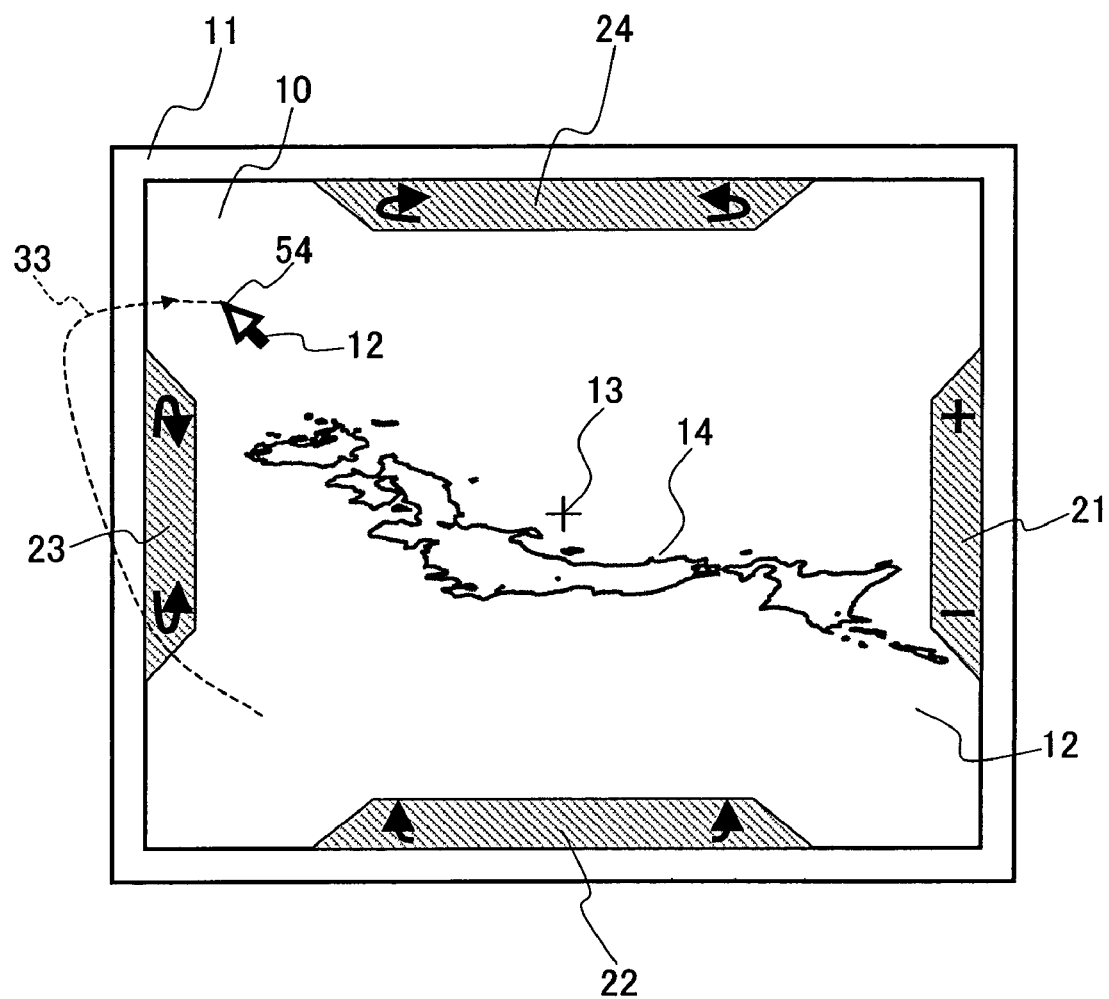
FIG. 7 shows an exemplary screen display of up-and-down rotation in the visual field changing method of Embodiment 1 according to the present invention.

FIG. 7 shows an exemplary display screen in the case of moving the pointer 12 along a pointer movement path 33 from the state in FIG. 6. By moving the pointer 12 across the visual field changing start region 23 related to up-and-down rotation, up-and-down rotation, i.e., rotation around a horizontal straight line parallel to the screen, passing through a position of the display object 14 in the vicinity of the window center coordinate 13, is performed.

In FIG. 7, the pointer 12 traverses the visual field changing start region 23, exits the display window 10, and is moved to the inside of the display window 10. In this case, even while the pointer 12 is outside the display window 10, visual field changing is continued, and visual field changing is deactivated when the pointer 12 is moved to the inside of the display window 10, whereby visual field changing is stopped.

As described above, according to Embodiment 1, various visual field changing operations can be performed only by moving the pointer 12 without involving pressing or releasing of a mouse button. Furthermore, after the pointer 12 is moved to the visual field changing start regions 21 to 24 to activate visual field changing, a minute operation such as moving of the pointer 12 in a narrow region such as a scroll bar is not required. Even in the case where the pointer 12 is moved out of the display window 10 to obtain a non-display state, visual field changing can be continued. Therefore, even in the case of performing a relatively rough operation, visual field changing can be performed.

Figure 8:
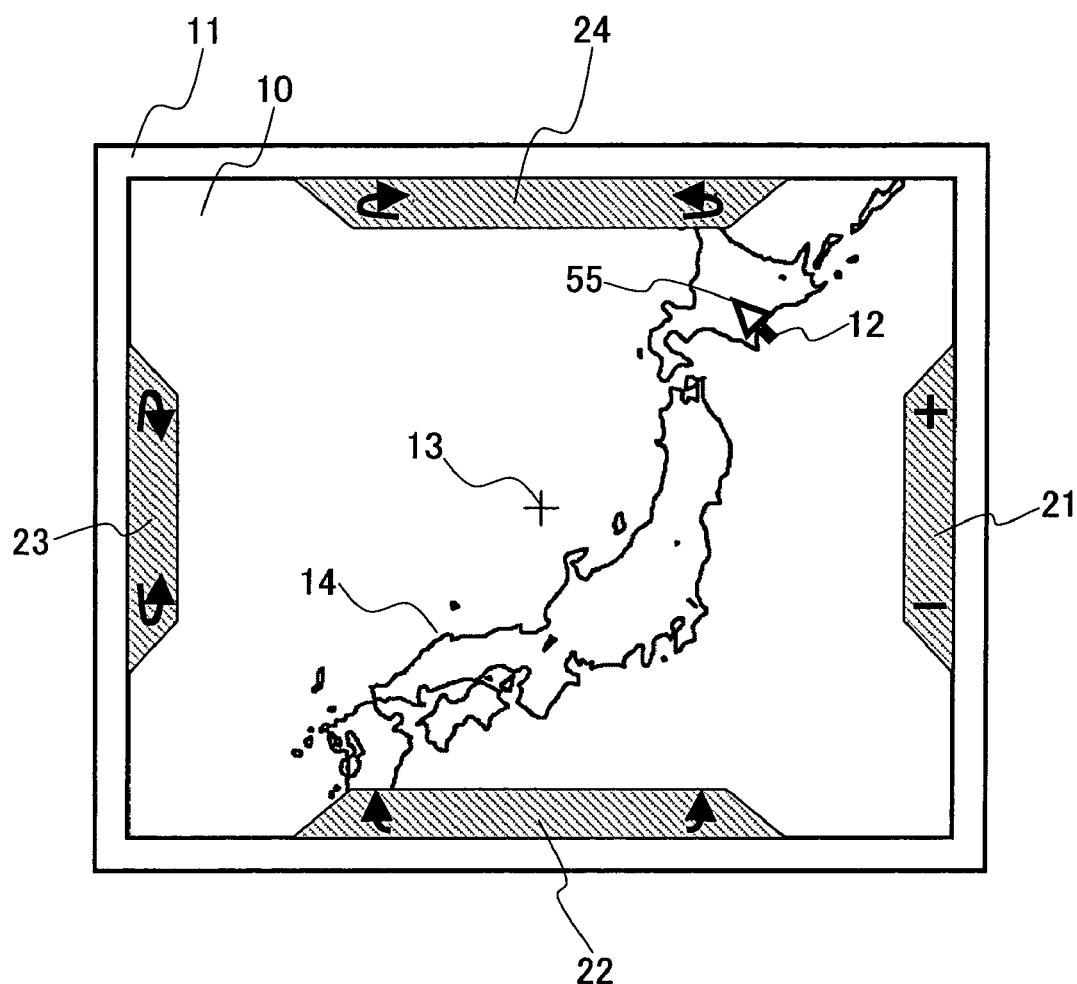
FIG. 8 shows an exemplary screen display of visual field parallel movement by a click in the visual field changing method of Embodiment 1 according to the present invention.
Figure 9:
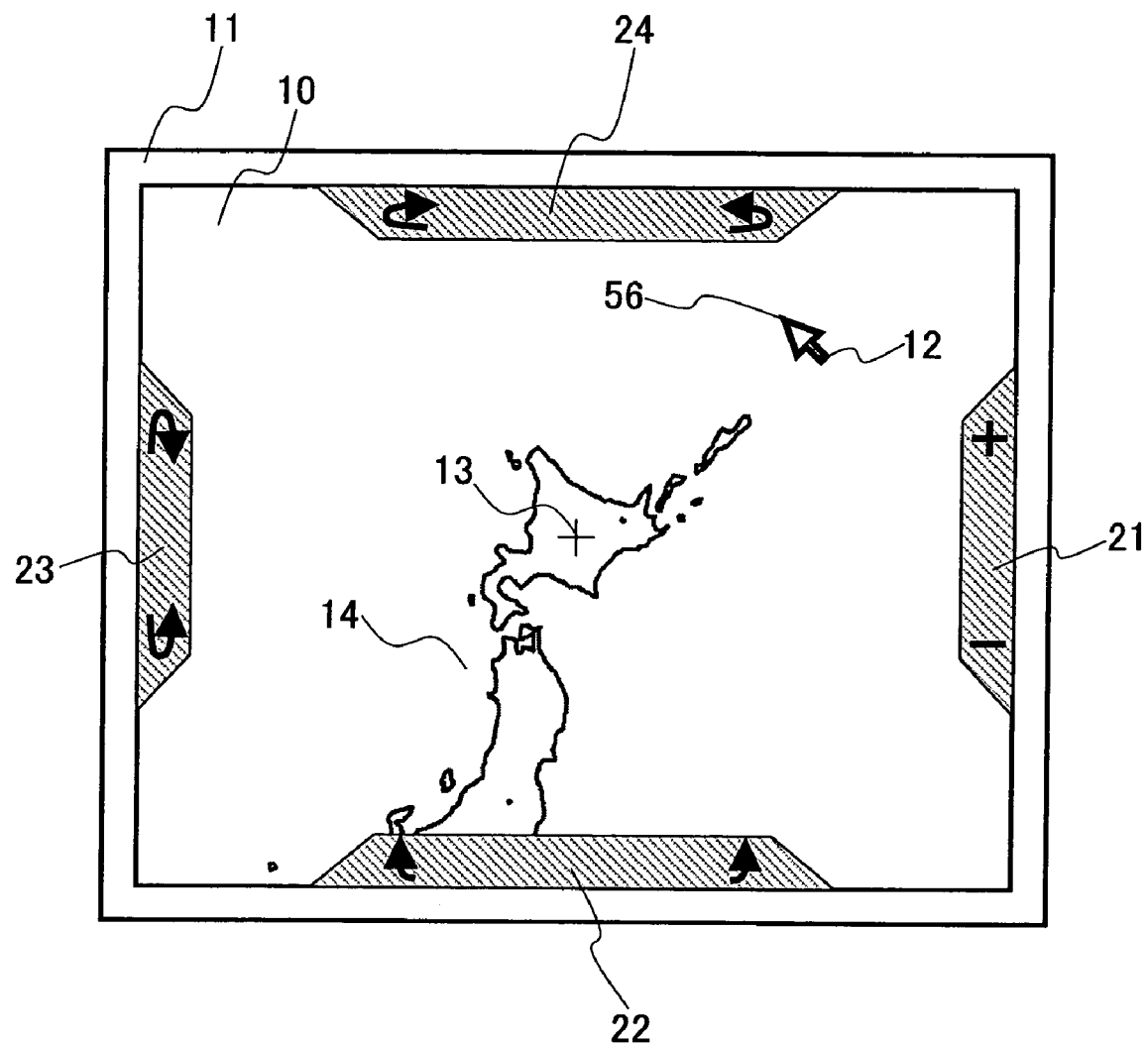
FIG. 9 shows an exemplary screen display of visual field parallel movement by a click in the visual field changing method of Embodiment 1 according to the present invention.

Next, parallel movement of a visual field will be described. FIGS. 8 and 9 show exemplary display screens related to parallel movement in the visual field changing method of Embodiment 1 according to the present invention.

When a click (selecting) operation of a mouse button or an operation equivalent thereto is performed in the state shown in FIG. 8, the visual information 117 is updated so that the position of the display object 14 at a position 55 pointed by the pointer 12 is placed in the vicinity of the window center coordinate 13, and the display of the display window 10 is also updated, whereby a screen display is changed as shown in FIG. 9.

More specifically, in an operation with a touch panel, pointer movement cannot be discriminated from dragging. However, a click and dragging can be discriminated from each other by determining whether or not a distance, by which the pointer 12 has been moved from a time when a finger or a stylus pen is brought into contact with the touch panel to a time when the finger of the stylus pen is detached therefrom, is a predetermined threshold value or less. Thus, the above-mentioned method for moving a visual field by a click can be performed similarly with a mouse or a touch panel.

Figure 10:
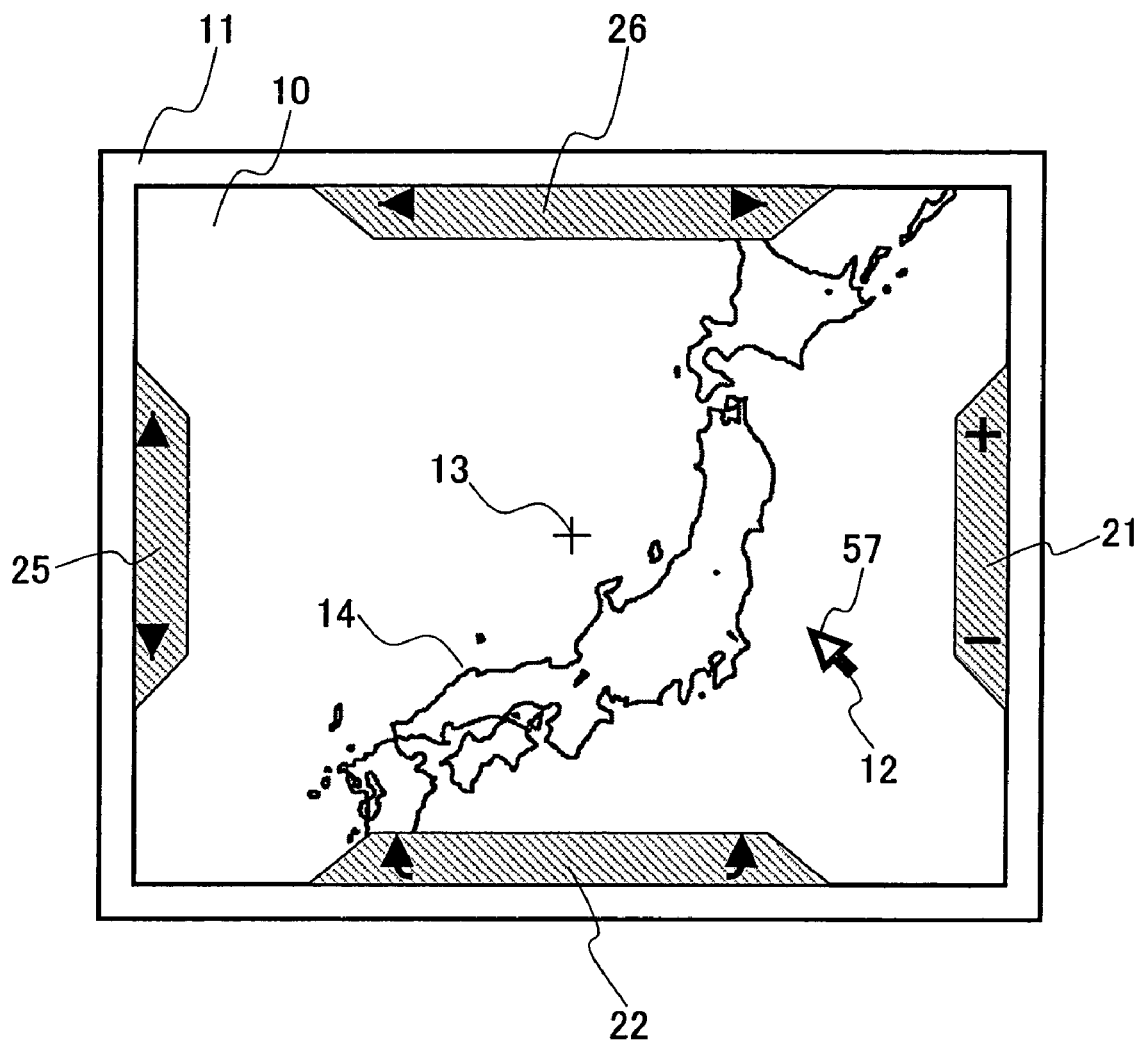
FIG. 10 shows an exemplary screen display in the visual field changing method of Embodiment 1 according to the present invention.

Furthermore, as shown in an exemplary display screen of FIG. 10, it is also considered to provide a visual field changing start region 25 for upward/downward movement and a visual field changing start region 26 for rightward/leftward movement, instead of the visual field changing start region 23 for up-and-down rotation and the visual field changing start region 24 for right-and-left rotation.

Figure 11:
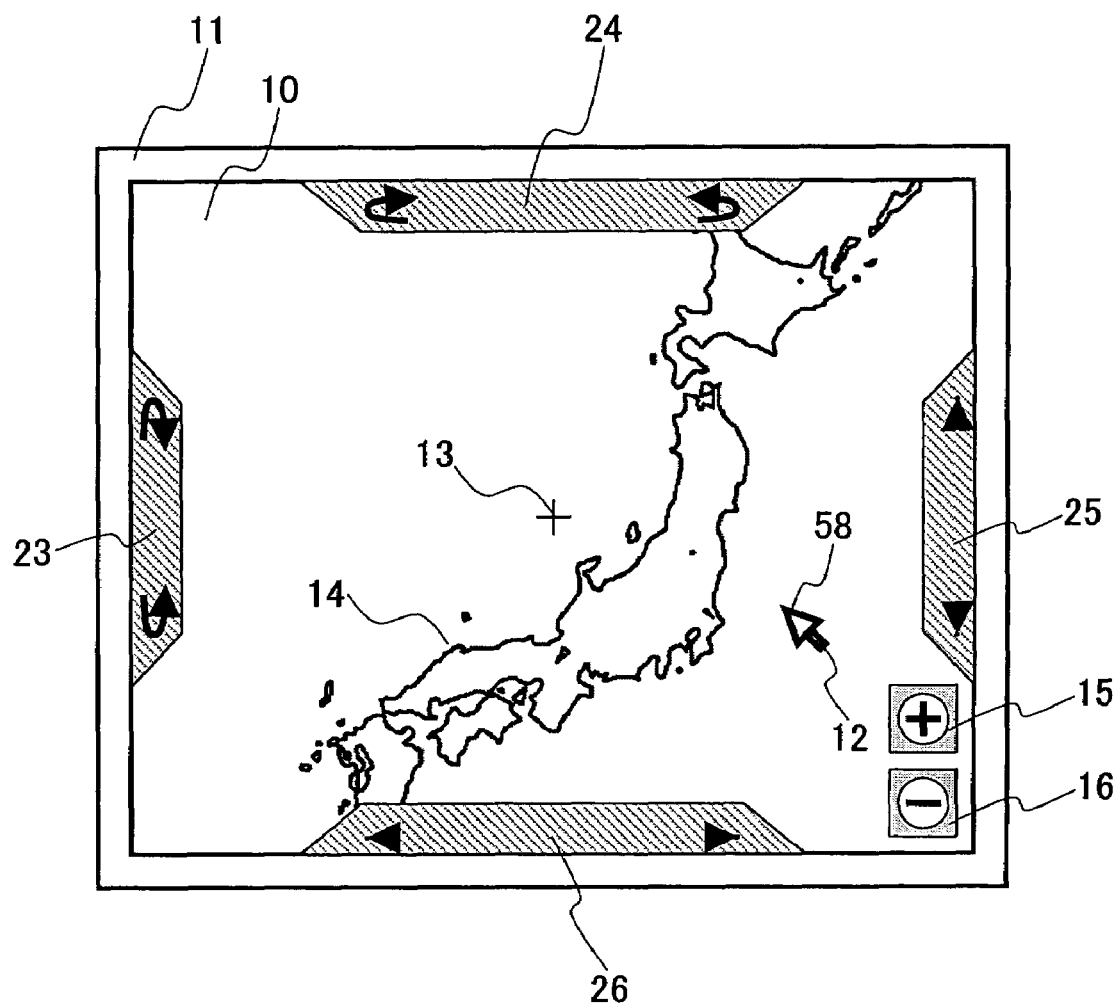
FIG. 11 shows an exemplary screen display in the visual field changing method of Embodiment 1 according to the present invention.

Furthermore, it is also considered to provide the visual field changing start region 25 for upward/downward movement and the visual field changing start region 26 for rightward/leftward movement, instead of the visual field changing start region 21 for zooming and the visual field changing start region 22 for azimuth rotation. FIG. 11 shows an exemplary screen display in this case.

In FIG. 11, since there is no visual field changing start region 21 for zooming, a zoom-in button 15 and a zoom-out button 16 are provided in the display window 10 so as to enable zooming. The visual information 117 and the display image data 103 are updated so that a visual field advances (or is zoomed in) by a predetermined amount or retracts (or is zoomed out) by a predetermined amount, in the case where a click (selecting) operation is performed with the pointer 12 placed on the zoom-in button 15 or the zoom-out button 16.

In Embodiment 1, instead of determining whether or not the position pointed by the pointer 12 is outside the visual field changing start region associated with the currently activated visual field changing and inside the display window 10 in Operation 210, it may be determined whether or not pressing or releasing of a mouse button or an operation equivalent thereto has been performed.

Alternatively, in Operation 210, it may also be determined whether or not the position pointed by the pointer 12 is outside the visual field changing start region associated with the currently activated visual field changing and inside the display window 10, or pressing or releasing of a mouse button or an operation equivalent thereto has been performed.

Furthermore, in Operation 210, it may be determined whether or not predetermined condition for deactivating previously determined arbitrary visual field changing other than those described above is satisfied. For example, the following is considered: in the case where the pointer 12 has not been moved for a predetermined period of time or longer, it is determined that a predetermined condition for deactivating visual field changing is satisfied.

Embodiment 2

Figure 3:
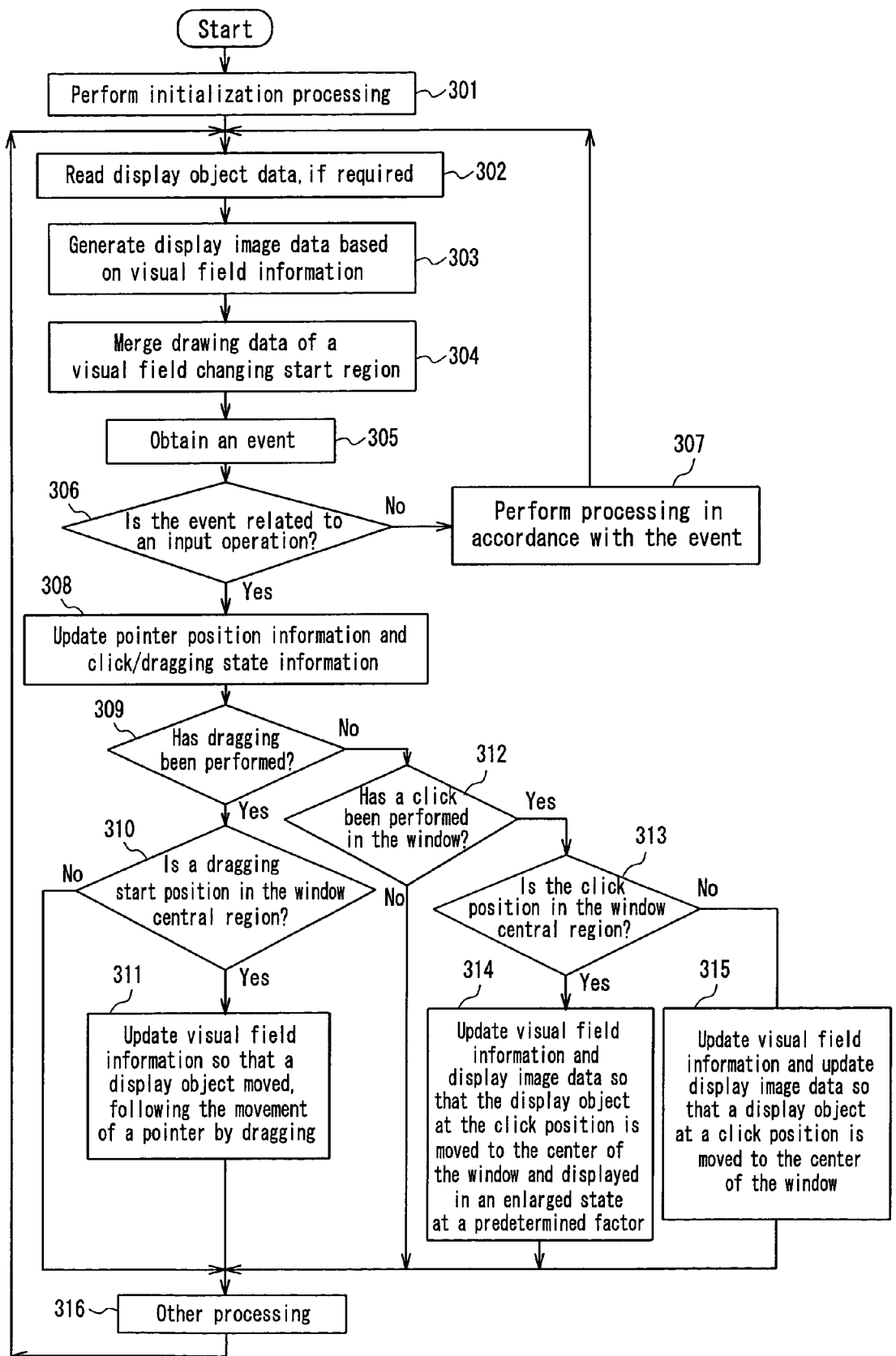
FIG. 3 is a flow chart illustrating processing in a visual field changing method of Embodiment 2 according to the present invention.

Hereinafter, a visual field changing method of Embodiment 2 according to the present invention will be described with reference to the drawings. FIG. 3 is a flow chart illustrating processing in the visual field changing method of Embodiment 2 according to the present invention.

In Embodiment 2, the display window 10 is previously partitioned into two regions: a central region 41 and a region 42 outside of the central region 41. When a click (selecting) operation is performed while the pointer 12 is placed in the display window 10, processing is varied depending upon which region the pointer 12 is placed in. According to such a configuration, intended visual field changing can be performed rapidly.

A window region border 43 for partitioning the central region 41 and the region 42 outside of the central region 41, and the window center coordinate 13 indicating the central portion of the display window 10 may not be displayed on a screen.

Furthermore, Embodiment 2 can be realized with substantially the same modular configuration as that shown in FIG. 1. However, in Embodiment 2, the visual field changing processing part 107, the visual field changing start region drawing part 108, the visual field changing processing defining information 114, and the visual field changing start region defining information 115 are not used.

In FIG. 3, first, initialization processing is performed in the same way as in Embodiment 1 (Operation 301). The display object data 118 is read, if required (Operation 302). The display image data 103 on the display object 14 to be displayed in the display window 10 is generated by the window content drawing part 109, based on the window defining information 116, the visual field information 117, and the display object data 118 (Operation 303). Furthermore, the drawing data on the visual field changing buttons 15 and 16 is also merged with the display image data 103 (Operation 304).

Then, an event is obtained (Operation 305). Herein, the event refers to information given to the display control program 102 from a generation origin of a cause, in the case where the position of the pointer 12 is changed, and the states of a click, dragging, and the like are changed.

Next, it is determined whether or not the obtained event is related to an input operation (Operation 306). In the case where it is determined that the obtained event is not related to an input operation (Operation 306: NO), after processing is performed in accordance with the event, processing from Operation 302 is continued (Operation 307).

In the case where it is determined that the obtained event is related to an input operation (Operation 306: YES), the pointer position is calculated by the pointer position calculating part 105, and the pointer position information 112 is updated. Furthermore, a click or dragging is detected by the click/dragging detecting part 106, and the click/dragging state information 113 is updated (Operation 308).

Next, it is determined whether or not dragging has been performed (Operation 309). In this determination, in the case where a distance, by which the pointer 12 is moved from a time when a mouse button is pressed or a finger or a stylus pen is brought into contact with a touch panel while the mouse button is being pressed or the finger or the stylus pen is in contact with the touch panel, exceeds a predetermined threshold value, it is determined that dragging has been performed. In the case where the mouse button is released or the finger or the stylus pen is detached from the touch panel before the distance by which the pointer 12 is moved exceeds a predetermined threshold value, it is determined a click has been performed.

In the case where it is determined that dragging has been performed (Operation 309: YES), it is determined whether or not the starting position of dragging, i.e., the position of the pointer 12 when the mouse button is pressed during dragging or when an operation equivalent thereto is performed is in the central region 41 of the display window 10 (Operation 310).

In the case where the starting position of dragging is in the central region 41 of the display window 10 (Operation 310: YES), the visual field changing amount is obtained so that the display object 14 displayed in the display window 10 is moved following the movement of the pointer 12 by dragging, and the visual field information 117 is updated (Operation 311).

On the other hand, it is determined that dragging has not been performed (Operation 309: NO), it is determined whether or not a click (selecting) operation has been performed in the display window 10 (Operation 312). It is assumed that the position where a click is performed is a position pointed by the pointer 12 when pressing of a mouse button or an operation equivalent thereto is performed in the click.

In the case where it is determined that a click (selecting) operation has been performed in the display window 10 (Operation 312: YES), it is determined whether or not the position where a click has been performed is in the central region 41 of the display window 10 (Operation 313).

In the case where it is determined that the position where a click has been performed is in the central region 41 of the display window 10 (Operation 313: YES), the visual field changing amount is calculated so that a portion of the display object 14 displayed at the position where the click has been performed is moved to the vicinity of the center of the window at which the window center coordinate 13 is displayed and is displayed in an enlarged state at a predetermined factor in the display window 10, and the visual field information 117 is updated. In addition, the display image data 103 to be displayed in the display window 10 by the window content display part 109 is updated (Operation 314).

In the case where the position where a click has not been performed is not in the central region 41 of the display window 10 (Operation 313: NO), the visual field changing amount is calculated so that a portion of the display object 14 displayed at the position where the click has been performed is moved to the vicinity of the center of the window at which the window center coordinate 13 is displayed in the display window 10, and the visual field information 117 is updated. In addition, the display image data 103 to be displayed in the display window 10 by the window content display part 109 is updated based on the updated visual field information 117.

In the update processing of the display image data 103, the following is desirable: the processing of updating a display while gradually changing the visual field information 117 is repeated until the visual field reaches an intended position, whereby a display is smoothly changed.

In the case where it is determined that the start position of dragging is not in the central region 41 of the display window 10 (Operation 310: NO), in the case where it is determined that a click (selecting) operation has not been performed in the display window 10 (Operation 312: NO), and after Operations 311, 314, and 315 are completed, the process returns to Operation 302 after the other processing is performed (Operation 316), and the above-mentioned processing is repeated.

The flow of the above-mentioned processing will be described based on a screen display. FIGS. 12 to 15 are exemplary display screens in the case of using the visual field changing method of Embodiment 2 according to the present invention.

Although the zoom-in button 15 and the zoom-out button 16 for zooming are displayed in FIGS. 12 to 15, they may not be displayed, if required.

Figure 12:
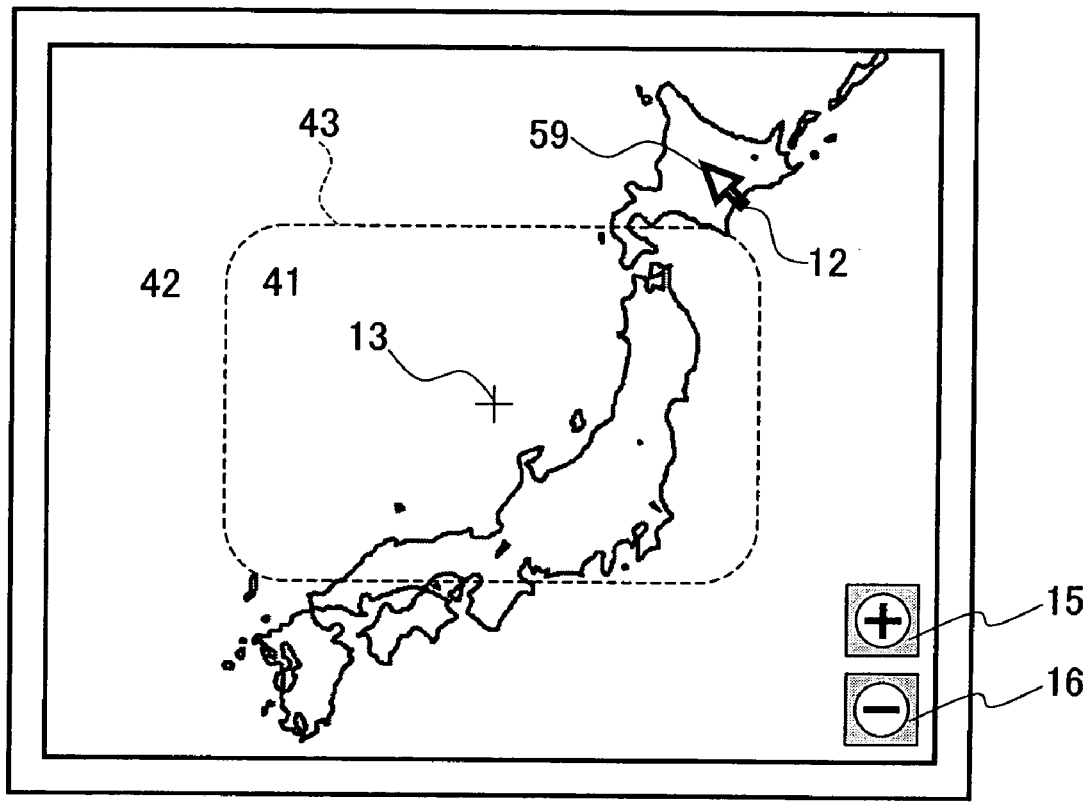
FIG. 12 shows an exemplary screen display of visual field changing by a click of a region outside of a central region of the display window in the visual field changing method of Embodiment 2 according to the present invention.
Figure 13:
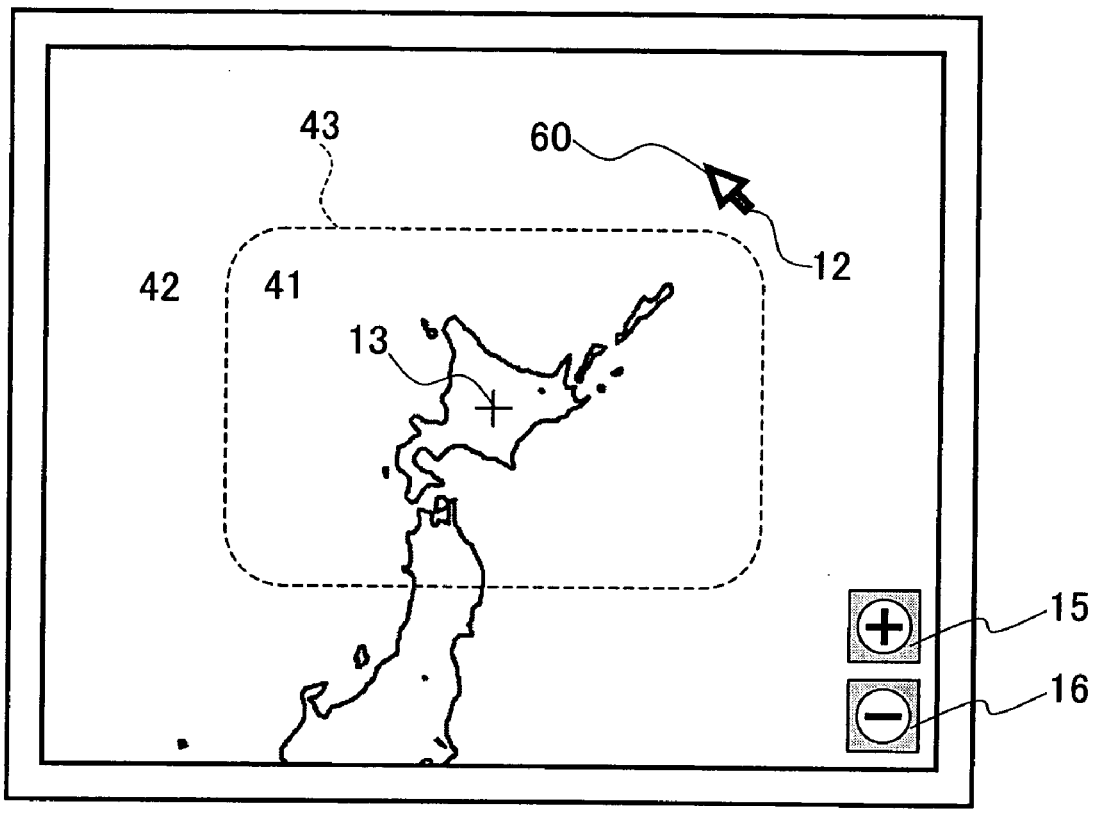
FIG. 13 shows an exemplary screen display of visual field changing by a click of the region outside of the central region of the display window in the visual field changing method of Embodiment 2 according to the present invention.

First, in FIG. 12, a position 59 in the region 42 outside of the central region 41 is pointed by the pointer 12. When a click of a mouse button or an operation equivalent thereto is performed in this state, the display object 14 in the vicinity of the position 59 is moved to the vicinity of the center of the window, and the display image data 103 is updated as shown in FIG. 13.

Figure 14:
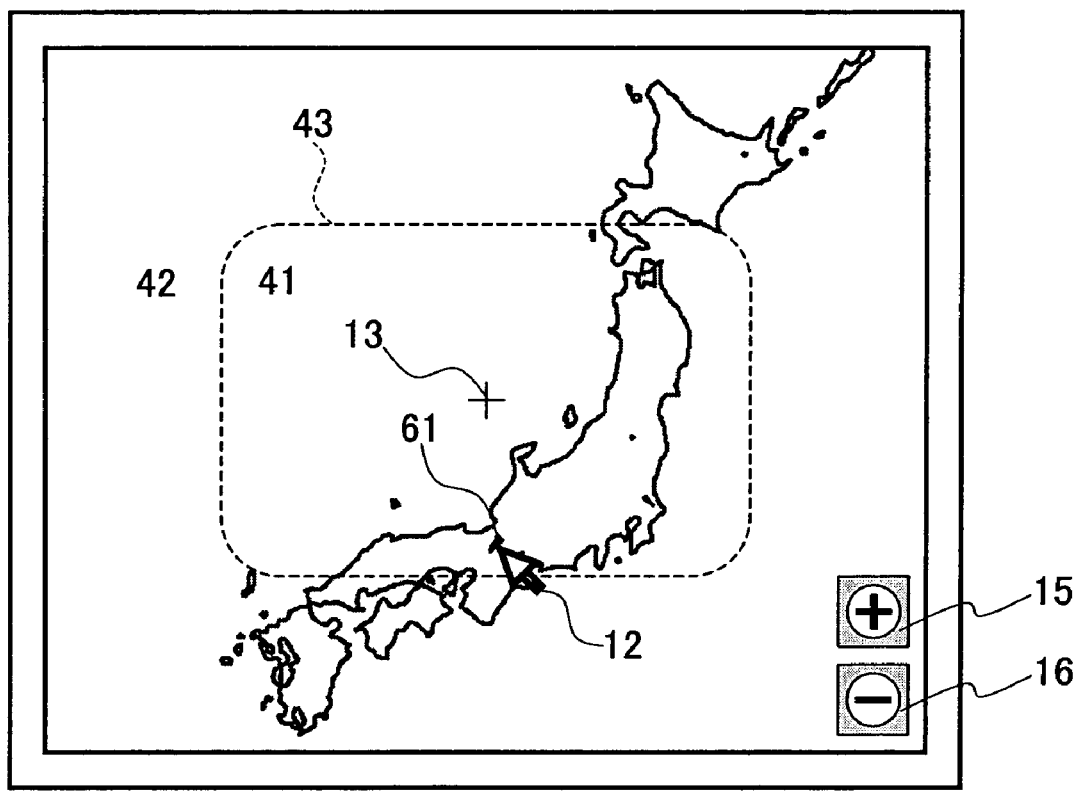
FIG. 14 shows an exemplary screen display of visual field changing by a click of the central region of the display window in the visual field changing method of Embodiment 2 according to the present invention.
Figure 15:
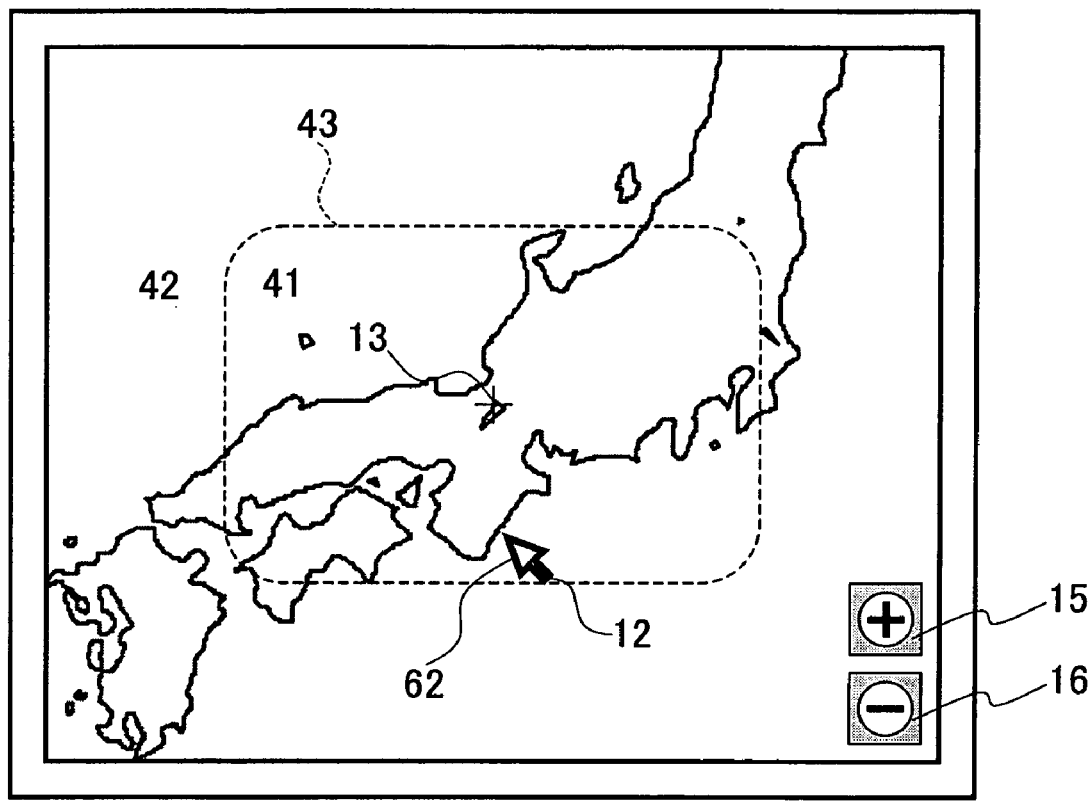
FIG. 15 shows an exemplary screen display of visual field changing by a click of the central region of the display window in the visual field changing method of Embodiment 2 according to the present invention.

In FIG. 14, a position 61 in the central region 41 of the display window 10 is pointed by the pointer 12. When a click of a mouse button or an operation equivalent thereto is performed in this state, the display object 14 in the vicinity of the position 61 is moved to the vicinity of the center of the window, and is displayed in an enlarged state at a predetermined factor, and the display image data is updated as shown in FIG. 15.

Figure 16:
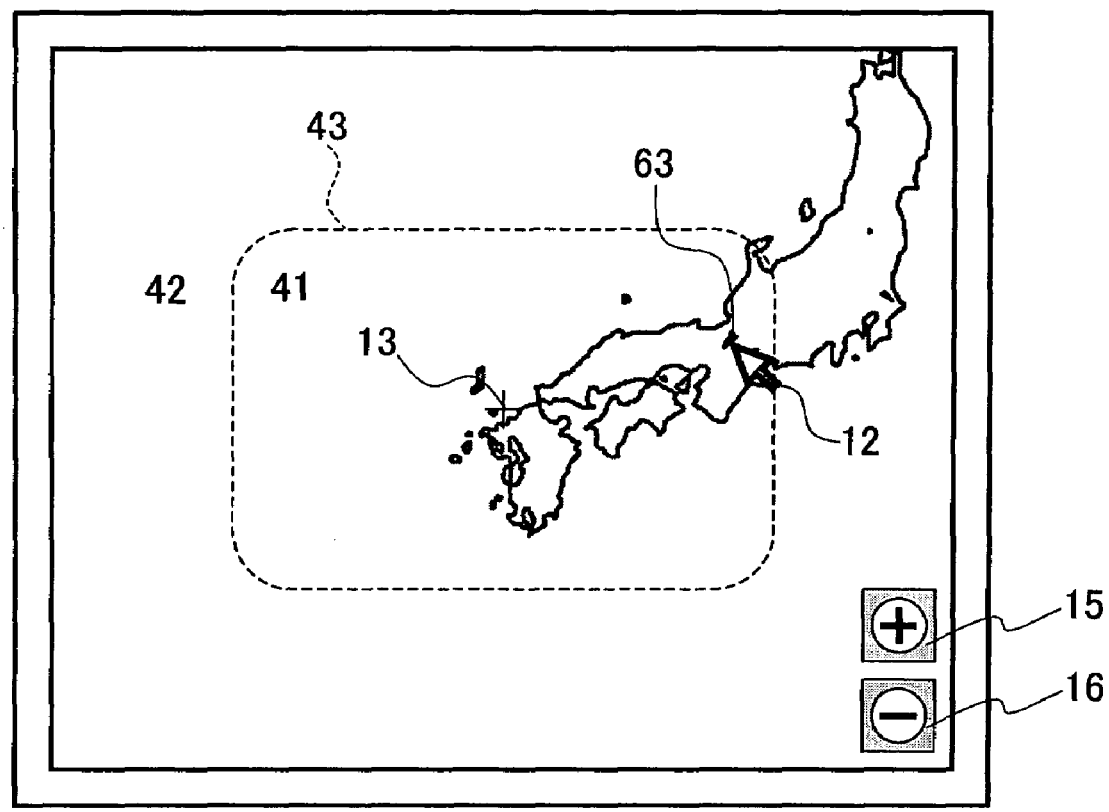
FIG. 16 shows an exemplary screen display of visual field changing by dragging from the central region of the display window in the visual field changing method of Embodiment 2 according to the present invention.

When pressing of a mouse button or an operation equivalent thereto is performed, followed by dragging from the state in FIG. 14, every time a movement event of the pointer 13 occurs during dragging, the display object 14 in the vicinity of the position 61 follows the movement of the pointer 12 to be moved to and displayed in the display window 10. The display object 14 is displayed, for example, as shown in FIG. 16.

As described above, according to Embodiment 2, visual field changing can be performed easily by a click of a mouse button, and in addition, visual field changing can be varied depending upon the position of a click in the display window 10.

Specifically, when it is desired to move a visual field in a horizontal direction, the region 42 outside of the central region 41 should be clicked. When it is desired to display a particular place in the vicinity of the center of the window in an enlarged state, the central region 41 of the display window 10 should be clicked. Thus, a complicated operation such as selection of an icon and switching of a mode can be avoided, whereby rapid visual field changing can be performed.

When it is desired to display the display object 14 displayed in the vicinity of the peripheral portion of the window in an enlarged state, the region 42 outside of the central region 41 is clicked so as to move a place desired to be enlarged to the vicinity of the center of the window, and thereafter, the central region 41 of the display window 10 is clicked again. Compared with the method for changing a visual field changing method by switching a mode or the like, visual field changing can be performed with a much easier operation.

Furthermore, by providing the zoom-out button 16, it is possible to easily bring an enlarged portion back to an original state.

Embodiment 3

Figure 17:
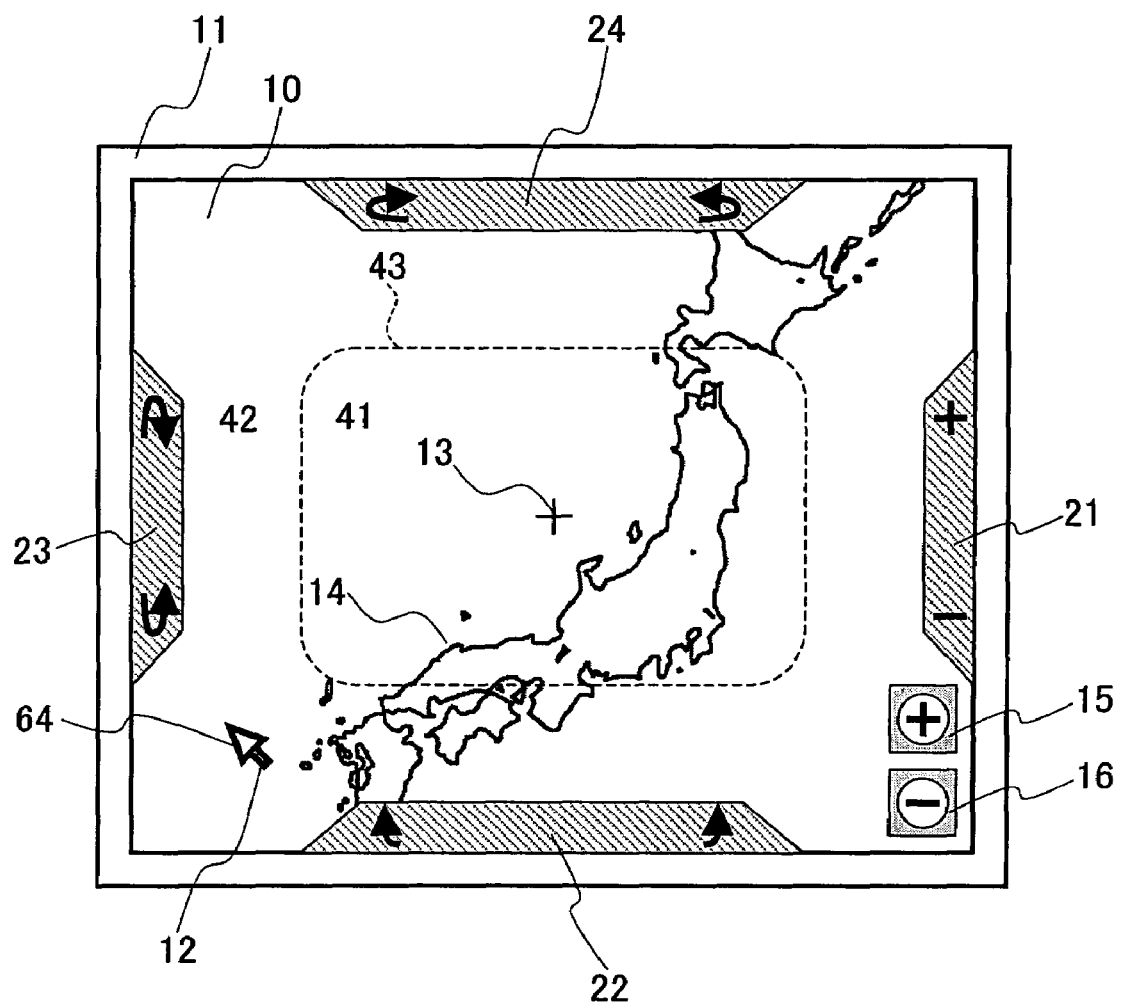
FIG. 17 shows an exemplary screen display in a visual field changing method of Embodiment 3 according to the present invention, illustrating a combination of a visual field changing start region and partition of window regions.

Hereinafter, a visual field changing method of Embodiment 3 according to the present invention will be described with reference to the drawings. Embodiment 3 is a combination of the above-mentioned Embodiments 1 and 2. FIG. 17 shows an exemplary screen display in the case of using the visual field changing method of Embodiment 3 according to the present invention.

In FIG. 17, a map is displayed as the display object 14 in the display window 10, and the pointer 12, the window center coordinate 13, the visual field changing start regions 21 to 24, the zoom-in button 15 and the zoom-out button 16 are displayed. Furthermore, the display window 10 is partitioned into the central region 41 and the region 42 outside of the central region 41.

In Embodiment 3, there is an advantage particularly in the case of performing an operation with a touch panel. As described above, in the touch panel, pointer movement cannot be discriminated from dragging. Therefore, a visual field changing method by dragging at an arbitrary position in the display window 10 cannot be combined with the visual field changing method of Embodiment 1. The reason for this is that when it is attempted to move the pointer 12 in the display window 10, dragging is erroneously recognized, and visual field changing is started.

In contrast, in Embodiment 3, when the pointer 12 starts being moved from the region 42 outside of the central region 41, dragging is not recognized, and the visual field changing by the same method as that in Embodiment 1 becomes possible. On the other hand, by starting the movement of the pointer 12 from the central region 41 of the display window 10, visual field changing by dragging becomes possible. Thus, even in the case of using a touch panel, the same effects as those in Embodiments 1 and 2 can be expected.

Embodiment 4

Hereinafter, a visual field changing method of Embodiment 4 according to the present invention will be described with reference to the drawings.

In Embodiment 4, a plurality of display objects 71 to 77 are displayed in one display window 10. When any of the display objects 71 to 77 is pointed by the pointer 12 and is clicked, visual field changing is performed so that the pointed display object is displayed at the center of the window 10. Embodiment 4 is characterized in that any one of the display objects 71 to 77 displayed in the display window 10 is determined as a representative object, and visual field changing is varied between the case where the display object pointed when a click is performed is the representative object and the other case.

More specifically, in the case where the pointed display object is a representative object, visual field changing is performed so that the point pointed on the display object is displayed at the center of the display window 10. On the other hand, in the case where the pointed display object is not a representative object, visual field changing is performed so that the entire pointed display object is displayed at the central portion of the display window 10 with a predetermined size. Furthermore, in the latter case, the pointed display object is determined as a new representative object after visual field changing.

As the method for selecting a representative object, various methods are considered. For example, among the display objects, an object is selected whose display range includes a central point of the display window 10, whose display width occupies a half or more of the width of the display window 10, and which is displayed on the forefront side. In the case where a visual field, arrangement of a display object is changed, and the like, a new representative object is selected.

Figure 20:
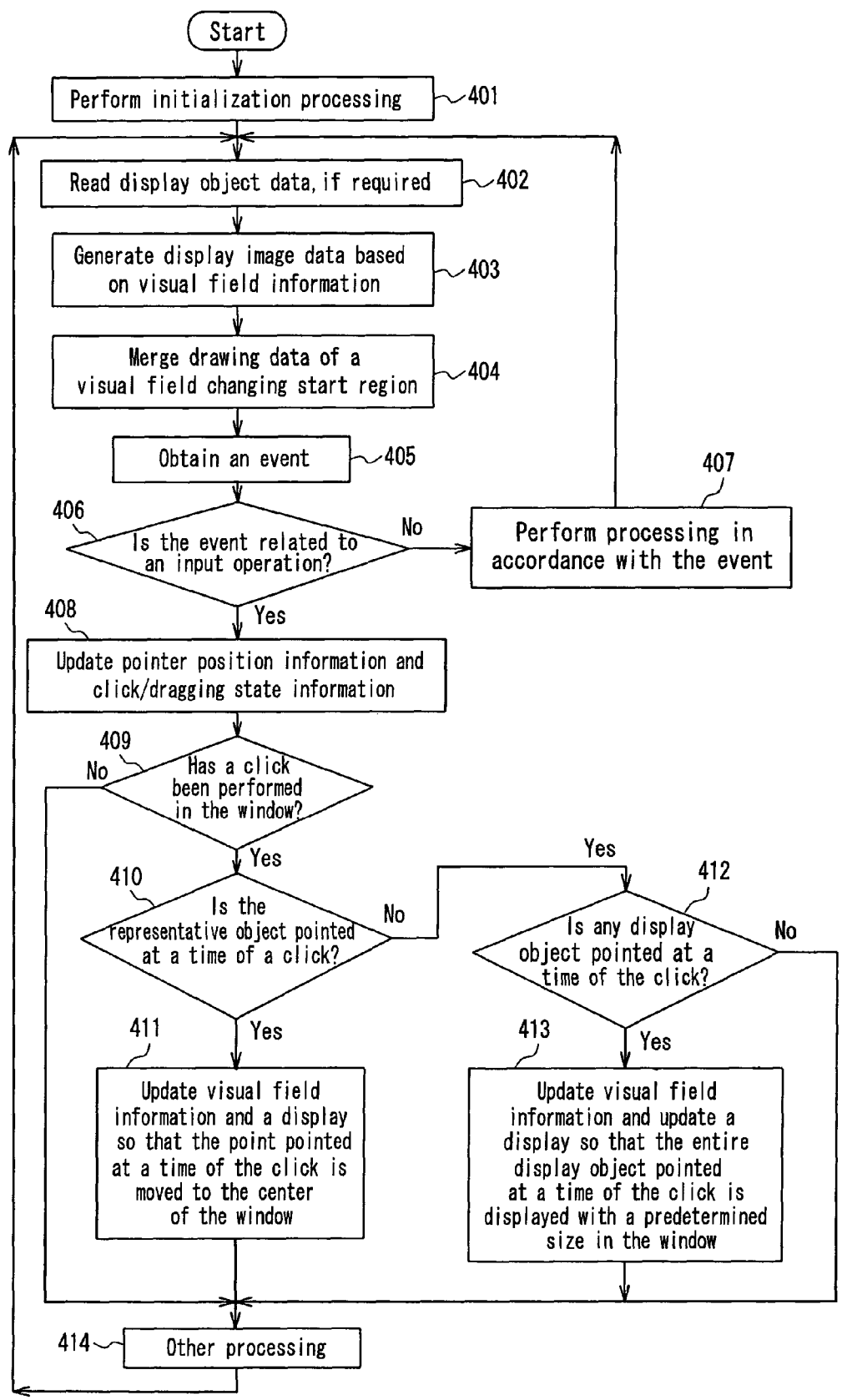
FIG. 20 is a flow chart illustrating processing in the visual field changing method of Embodiment 4 according to the present invention.

FIG. 20 shows the processing flow in the visual field changing method of Embodiment 4 according to the present invention. In FIG. 20, the same initialization processing as that in Embodiment 1 is performed (Operation 401). The display object data 118 is read, if required (Operation 402), and any of the display objects is selected as one representative object based on a predetermined rule (Operation 403).

Next, the display image data 103 on the display objects 71 to 77 to be displayed in the display window 10 is generated by the window content drawing part 109, based on the window defining information 116, the visual field information 117, and the display object data 118 (Operation 404).

Then, an event is obtained (Operation 405). Herein, the event refers to information given to the display control program 102 from a generation origin of a cause, in the case where the position of the pointer 12 is changed, and the states of a click, dragging, and the like are changed.

Next, it is determined whether or not the obtained event is related to an input operation (Operation 406). In the case where it is determined that the obtained event is not related to an input operation (Operation 406: NO), after processing is performed in accordance with the event, processing is continued from Operation 402 (Operation 407).

In the case where it is determined that the obtained event is related to an input operation (Operation 406: YES), the pointer position is calculated by the pointer position calculating part 105, and the pointer position information 112 is updated. Furthermore, a click or dragging is detected by the click/dragging detecting part 106, and the click/dragging state information 113 is updated (Operation 408).

Then, it is determined whether or not a click (selecting) operation has been performed in the display window 10 (Operation 409). In the case where it is determined that a click (selecting) operation has been performed in the display window 10 (Operation 409: YES), it is determined whether or not the pointer 12 points a representative object (Operation 410).

In the case where it is determined that the pointer 12 points the representative object (Operation 410: YES), the visual field changing amount is calculated so that the point on the representative object pointed by the pointer 12 at a time of the click is moved to the central portion of the display window 10, the visual information 117 is updated, and the display image data 103 on the display objects 71 to 77 to be displayed in the display window 10 by the window content display part 109 is updated based on the updated visual field information 117 (Operation 411).

In the case where it is determined that the pointer 12 does not point a representative object (Operation 410: NO), it is determined whether or not any of the display objects is pointed by the pointer 12 at a time when it is determined that a click has been performed in the display window 10 (Operation 412).

In the chase where it is determined that any of the display objects is pointed by the pointer 12 (Operation 413: YES), the visual field changing amount is calculated so that the entire display object pointed by the pointer 12 at a time of the click is displayed at the central portion of the display window 10 with a predetermined size, the visual field information 117 is updated, and the display image data 103 on the display objects 71 to 77 to be displayed in the display window 10 by the window content display part 109 is updated based on the updated visual field information 117.

Regarding the update processing of the display image data 103, the following is desirable: the processing of gradually changing the visual field information 117 to update a display is repeated until the visual field reaches an intended position, whereby a display is smoothly changed.

In the case where it is determined that a click (selecting) operation has not been performed in the display window 10 (Operation 409: NO), in the case where it is determined that any of the display objects is not pointed by the pointer 12 at a time when it is determined that a click has been performed (Operation 412: NO), and after Operations 411 and 413 are completed, the process returns to Operation 402 after the other processing is performed (Operation 414), and the above-mentioned processing is repeated.

Figure 18:
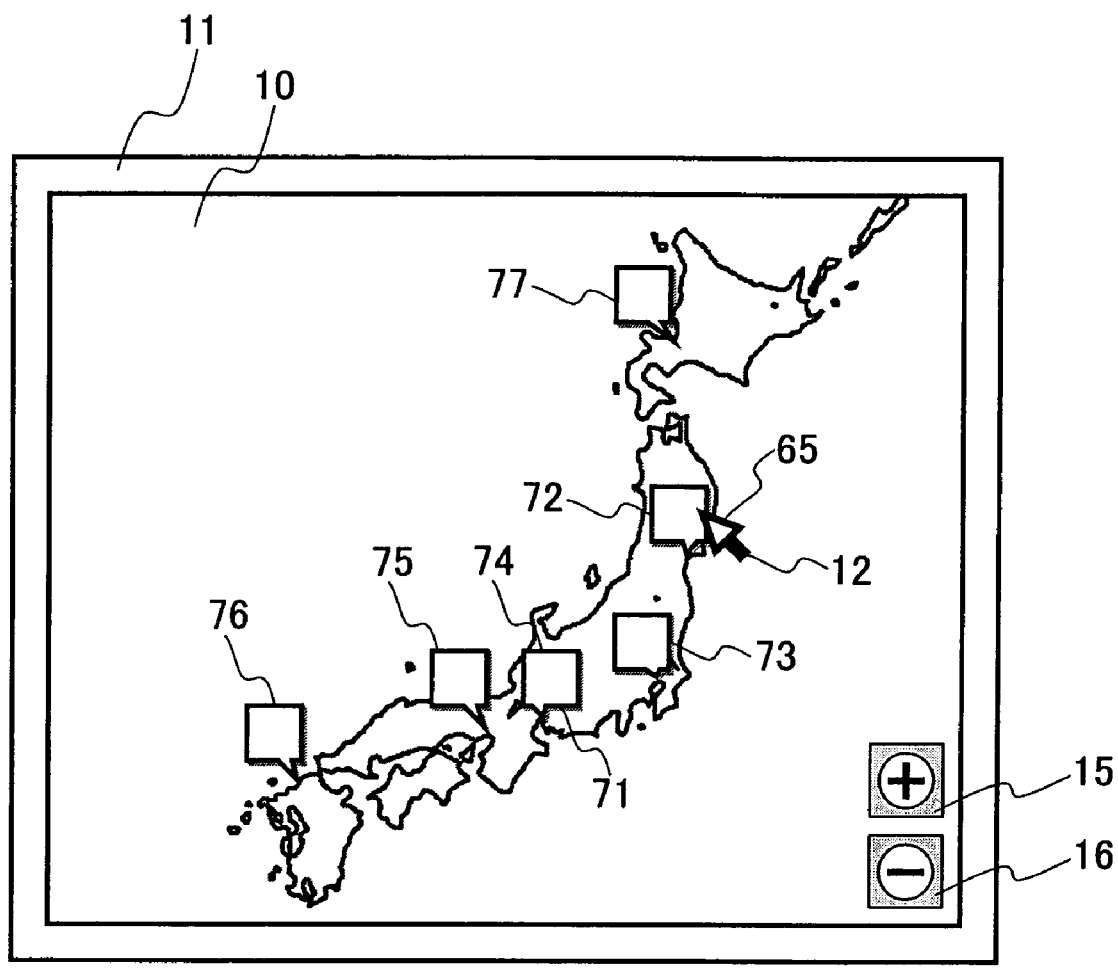
FIG. 18 shows an exemplary screen display of visual field changing by a click in a visual field changing method of Embodiment 4 according to the present invention.
Figure 19:
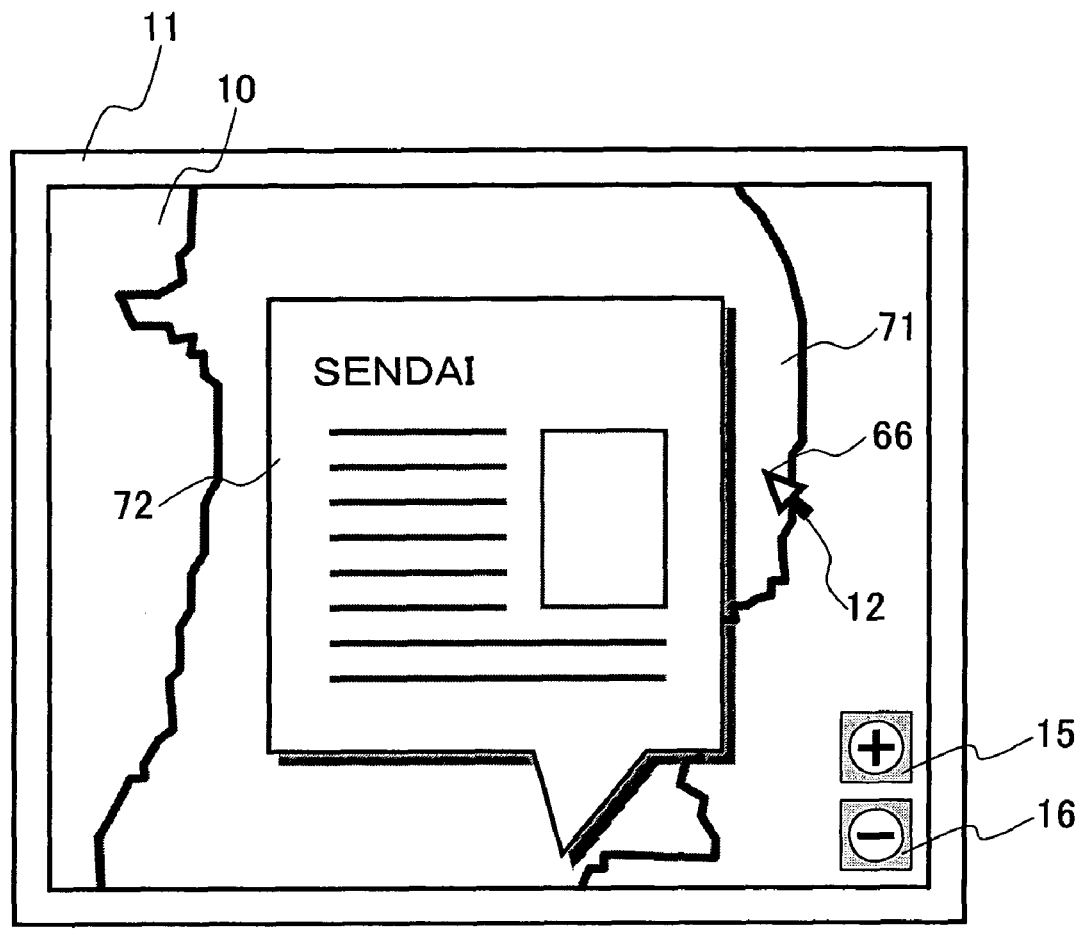
FIG. 19 shows an exemplary screen display of visual field changing by a click in the visual field changing method of Embodiment 4 according to the present invention.

The above-mentioned processing flow will be described based on a screen display. FIGS. 18 and 19 are exemplary display screens in the case of using the visual field changing method of Embodiment 4 according to the present invention.

FIG. 18 shows an exemplary screen display before visual field changing, and the display objects 71 to 77 are displayed in the display window 10. In Embodiment 4, the display object 71 is displayed with a large size in the entire window, and the display objects 72 to 77 are displayed with a small size on the front side of the display object 71. Furthermore, the zoom-in button 15 and the zoom-out button 16 are displayed. In FIG. 18, it is assumed that the display object 71 (map of Japan) is selected as a representative object.

In FIG. 18, the display object 72 that is not a representative object is pointed by the pointer 12. When a click of a mouse button or an operation equivalent thereto is performed in this state, a visual field is moved, and a screen display is updated as shown in FIG. 19. Specifically, the entire display object 72 pointed by the pointer 12 at a time of a click is displayed with a large size in the vicinity of the center of the display window 10. The visual field changing at this time involves zoom-in processing for enlarging the display object 72. Furthermore, the display object 72 displayed with a large size at the center of a screen is selected as a new representative object in place of the display object 71.

Furthermore, it is also considered that the display content of each display object is changed in synchronization with such visual field changing. For example, regarding the display object 72 displayed with a large size as shown in FIG. 19, the content may be changed so as to display more detailed information than that displayed with a small size as shown in FIG. 18.

In FIG. 19, the display object 71 that is not a representative object any more at this time is pointed by the pointer 12. When a click of a mouse button or an operation equivalent thereto is performed in this state, the same processing as described above is performed, and the entire display object 71 pointed by the pointer 12 at a time of a click is displayed with a large size in the vicinity of the center of the display window 10 as shown in FIG. 18. The visual field changing at this time involves zoom-out processing for displaying the entire display object 72 in the display window 10. Furthermore, the display object 71 is selected as a new representative object in place of the display object 72.

In the case where the pointer 12 is moved so as to point the display object 71 that is a representative object, followed by clicking, in FIG. 18, or in the case where the pointer 12 is moved so as to point the display object 72 that is a representative object, followed by clicking, in FIG. 19, a visual field is moved so that the point pointed on the representative object is placed at the center of the display window 10, and the display image data 103 is updated. In this case, the visual field is moved so as to slide in parallel with a screen or the surface of a display object, and zoom-in or zoom-out is not performed.

As described above, according to Embodiment 4, visual field changing can be performed easily with a click of a mouse button, and visual field changing can be varied depending upon the display object pointed by a click.

More specifically, when it is desired to display a particular portion of the current representative object at the center of a screen, the current representative object should be pointed and clicked. When it is desired to display the display object that is not a representative object is displayed with a large size at the center of the screen, the display object desired to be displayed should be pointed and clicked. Because of this, rapid visual field changing can be performed without a complicated operation such as selection of an icon and a switching of a mode.

Furthermore, if the zoom-in button 15 and the zoom-out button 16 are provided, and zoom-in or zoom-out is performed in the case where pressing of a mouse button or an operation equivalent thereto is performed with each button pointed by the pointer, after a visual field is changed by a click, a display object can be increased/decreased in size arbitrarily, whereby a visual field can be changed more freely.

Furthermore, Embodiment 4 can be combined with the above-mentioned Embodiments 1, 2 and 3. Because of this, a visual field can be changed more rapidly.

Figure 21:
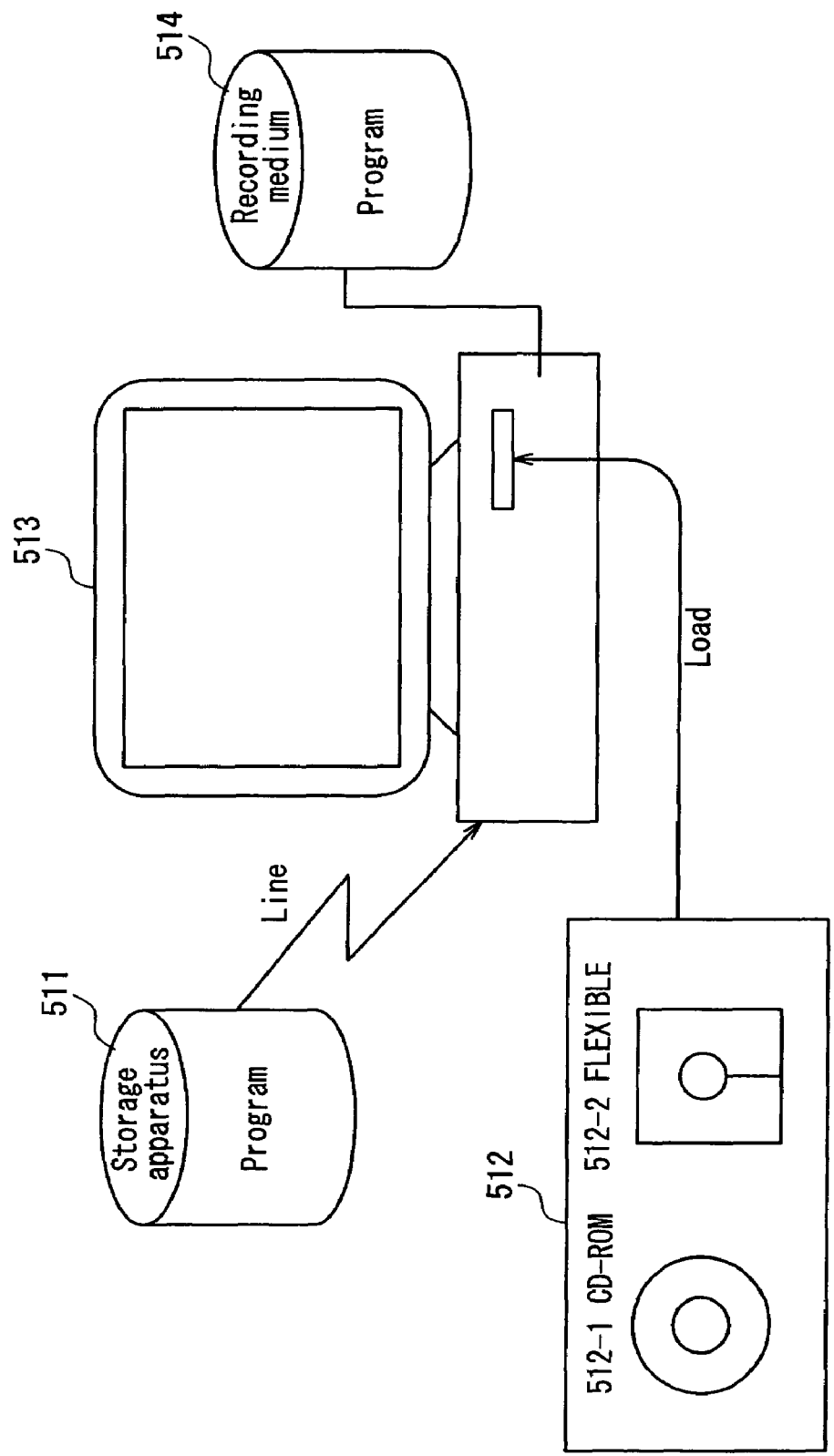
FIG. 21 illustrates a computer environment.

A program for realizing the visual field changing methods of Embodiments 1 to 4 according to the present invention may be stored not only in a portable recording medium 512 such as a CD-ROM 512-1 and a flexible disk 512-2, but also in another storage apparatus 511 provided at the end of a communication line and a recording medium 514 such as a hard disk and a RAM of a computer 513, as shown in FIG. 21. In execution, the program is loaded and executed on a main memory.

Furthermore, display object data and the like read by adopting the visual field changing methods of the embodiments according to the present invention may also be stored not only in a portable recording medium 512 such as a CD-ROM 512-1 and a flexible disk 512-2, but also in another storage apparatus 511 provided at the end of a communication line and a recording medium 514 such as a hard disk and a RAM of a computer 513, as shown in FIG. 21. For example, such data is read by the computer 513 when the visual field changing method of the present invention is realized.

As described above, according to the visual field changing method of the present invention, a visual field changing operation can be performed easily only by moving a pointer without dragging. Furthermore, it is not required to perform a minute operation such as movement of a pointer to a narrow region such as an icon and a scroll bar so as to change a visual field. Furthermore, it is not necessary to perform an operation requiring a minute operation timing, and a visual field can be moved easily merely by clicking a mouse button.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A visual field changing method comprising, in an image display system having functions of displaying image data in a display window:

determining a position of a pointer in the display window by using an operation input part, and receiving a visual field changing instruction from a user and changing a display of the image data based on the visual field changing instruction;

displaying one or a plurality of visual field changing start region associated with a visual field changing operation, which defines display update processing contents of the image data, in the display window;

determining whether or not the pointer is in the visual field changing start region;

activating the visual field changing operation associated with the visual field changing start region immediately when it is determined that the pointer enters the visual field changing start region;

while the visual field changing operation is being activated, detecting a relative movement amount of the pointer based on the position of the pointer at a time when the visual field changing operation is activated, and updating the display of the image data in accordance with the display update processing contents defined by the activated visual field changing operation, based on the detected relative movement amount of the pointer;

determining whether or not a predetermined condition for deactivating the visual field changing operation is satisfied;

immediately when the predetermined condition for deactivating the visual field changing operation is satisfied, deactivating the visual field changing operation; and determining whether or not the pointer is in the display window, wherein determining whether or not a predetermined condition for deactivating the visual field changing operation is satisfied includes determining that the predetermined condition for deactivating the visual field changing operation is not satisfied when the pointer is present outside of the visual field changing start region corresponding to the activated visual field changing operation and outside of the display window and determining that the predetermined condition for deactivating the visual field changing operation is satisfied immediately when it is determined that the pointer is present outside of the visual field changing start region corresponding to the activated visual field changing operation and in the display window, and the visual field changing start region is placed for display so as to be in contact with a boundary between the inside of the display window and the outside of the display window.

2. The visual field changing method according to claim 1, comprising: detecting pressing or releasing of a button of the operation input part or an operation equivalent thereto; and in determining whether or not the predetermined condition for deactivating the visual field changing operation is satisfied, determining that the predetermined condition for deactivating the visual field changing operation is satisfied in a case where the pressing or releasing of the button or the operation equivalent thereto is detected.

3. The visual field changing method according to claim 1, wherein the display update processing contents of the image data defined by the visual field changing operation include calculating a visual field changing amount only with respect to either one component among the detected relative movement amount components in an upward/downward direction and a rightward/leftward direction of the pointer with respect to the display window.

4. The visual field changing method according to claim 1, wherein the visual field changing start region is displayed in a semi-transparent state on a front side of a display object to be displayed in the display window so that the display object is seen through.

5. The visual field changing method according to claim 1, wherein, while the visual field changing operation is being activated, the visual field changing start region corresponding to the activated visual field changing operation is displayed in a different manner from that in a case where the visual field changing operation is deactivated.

6. The visual field changing method according to claim 1, comprising detecting a selecting operation in the operation input part, and in a case where the pointer is in the display window and the selecting operation is detected, the display of the image data is updated so that a display object displayed at a position of the pointer is moved to a center of the display window.

7. The visual field changing method according to claim 6, comprising, in detecting the selecting operation: obtaining a movement distance of the pointer from a point where pressing of the button or an operation equivalent thereto has been performed; and in a case where the movement distance of the pointer from the point where the pressing of the button or the operation equivalent thereto has been performed is equal to or less than a predetermined threshold value, when releasing of the button or an operation equivalent thereto is performed, determining that the selecting operation has been performed.

8. The visual field changing method according to claim 1, comprising:

detecting a selecting operation in the operation input part;

in a case where the pointer is in the display window, dividing the display window into two regions of a central region of the display window and a region outside of the central region of the display window, and determining in which region the pointer is placed;

in a case where it is determined that the pointer is placed in the region outside of the central region of the display window when the selecting operation is detected, updating the display of the image data so that a display object displayed at a position of the pointer is moved to a center of the display window without being enlarged; and in a case where it is determined that the pointer is placed in the central region of the display window when the selecting operation is detected, updating the display of the image data so that the display object displayed at the position of the pointer is moved to the center of the display window and displayed in an enlarged state at a predetermined factor.

9. The visual field changing method according to claim 8, comprising:

determining whether or not a distance, by which the pointer has been moved from a point where pressing of a button or an operation equivalent thereto has been performed to a point where releasing of the button or an operation equivalent thereto has been performed, exceeds a predetermined threshold value;

in a case where it is determined that the distance does not exceed the predetermined threshold value, determining that the selecting operation has been performed;

in a case where it is determined that the distance exceeds the predetermined threshold value, determining that dragging has been performed instead of the selecting operation; and in a case where the pointer is placed in the central region of the display window, and the pressing of the button or the operation equivalent thereto is performed, followed by the dragging, during a period of time before the releasing of the button or the operation equivalent thereto is performed, updating the display of the image data continuously so that the display object, which is displayed at the position of the pointer when the pressing of the button or the operation equivalent thereto has been performed, is displayed so as to move in the display window, following the movement of the pointer.

10. A recording medium storing a computer-executable program for realizing a visual field changing method in an image display system having functions of displaying image data in a display window, determining a position of a pointer in the display window by using an operation input part, and receiving a visual field changing instruction from a user and changing a display of the image data based on the visual field changing instruction, a computer being caused to execute the program comprising:

displaying one or a plurality of visual field changing start region associated with a visual field changing operation, which defines display update processing contents of the image data, in the display window;

determining whether or not the pointer is in the visual field changing start region;

activating the visual field changing operation associated with the visual field changing start region when the pointer enters the visual field changing start region;

while the visual field changing operation is being activated, detecting a relative movement amount of the pointer based on the position of the pointer at a time when the visual field changing operation is activated, and updating the display of the image data in accordance with the display update processing contents defined by the activated visual field changing operation, based on the detected relative movement amount of the pointer;

determining whether or not a predetermined condition for deactivating the visual field changing operation is satisfied;

in a case where the predetermined condition for deactivating the visual field changing operation is satisfied, deactivating the visual field changing operation; and determining whether or not the pointer is in the display window, wherein in determining whether or not a predetermined condition for deactivating the visual field changing operation is satisfied, the computer further caused to execute determining that the predetermined condition for deactivating the visual field changing operation is not satisfied when the pointer is present outside of the visual field changing start region corresponding to the activated visual field changing operation and outside of the display window and determining that a predetermined condition for deactivating the visual field changing operation is satisfied immediately when it is determined that the pointer is present outside of the visual field changing start region corresponding to the activated field changing operation and in the display window, and the visual field changing start region is placed for display so as to be contact with a boundary between the inside of the display window and the outside of the display window.

* * * * *